Feb. 21, 1961  W. A. THORNTON  2,972,692
METHOD FOR OPERATING ELECTROLUMINESCENT
CELL AND ELECTROLUMINESCENT APPARATUS
Filed May 2, 1958  6 Sheets-Sheet 1

INVENTOR.
W. A. THORNTON.
BY
W. D. Palmer
ATTORNEY.

INVENTOR.
W. A. THORNTON.
BY W. D. Palmer
ATTORNEY.

INVENTOR.
W. A. THORNTON
BY
W. D. Palmer
ATTORNEY.

INVENTOR.
W. A. THORNTON
BY W. D. Palmer
ATTORNEY.

Feb. 21, 1961 W. A. THORNTON 2,972,692
METHOD FOR OPERATING ELECTROLUMINESCENT
CELL AND ELECTROLUMINESCENT APPARATUS
Filed May 2, 1958 6 Sheets-Sheet 5

INVENTOR.
W. A. THORNTON.
BY W.D. Palmer
ATTORNEY.

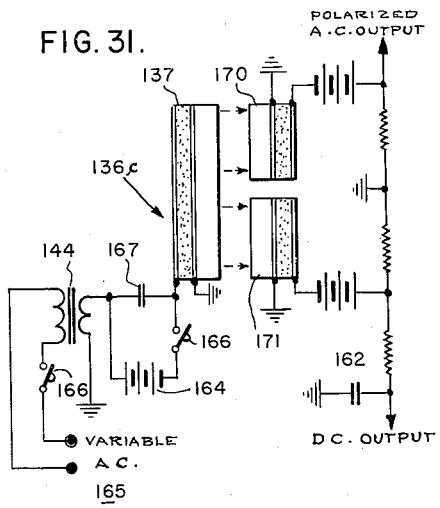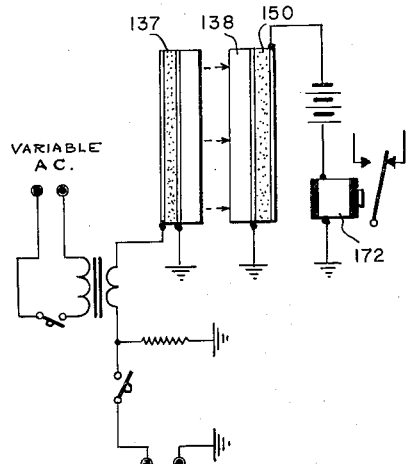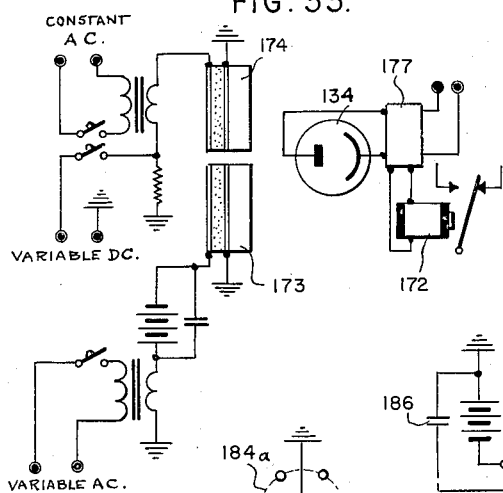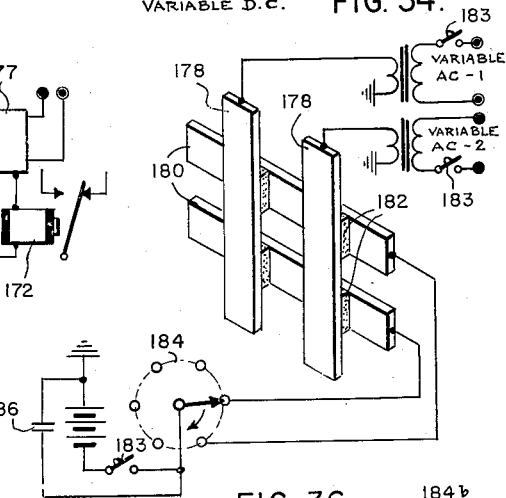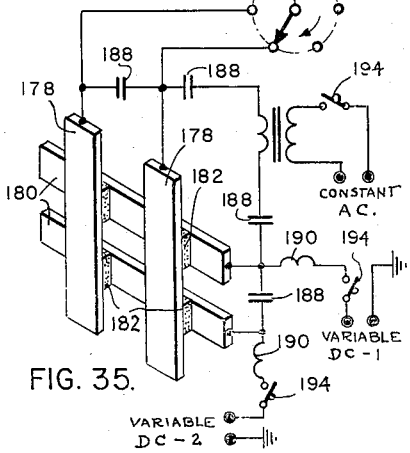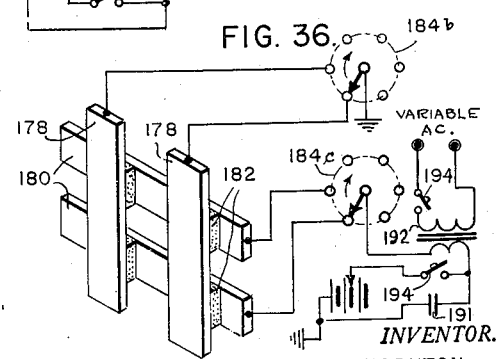

United States Patent Office 2,972,692
Patented Feb. 21, 1961

2,972,692
METHOD FOR OPERATING ELECTROLUMINES-
CENT CELL AND ELECTROLUMINESCENT AP-
PARATUS

William A. Thornton, Cranford, N.J., assignor to
Westinghouse Electric Corporation, East Pittsburgh,
Pa., a corporation of Pennsylvania Filed May 2, 1958, Ser. No. 732,510

19 Claims. (Cl. 313—108)

This invention relates to electroluminescent cells and, more particularly, to methods for operating electroluminescent cells and electroluminescent apparatus.

The phenomenon of electroluminescence was first disclosed by G. Destriau, one of his earlier publications being in London, Edinburgh and Dublin Philosophical Magazine, series 7, volume 38, No. 285, pages 700–737 (October 1947). A more recent comprehensive summary of electroluminescence can be found in Destriau and Ivey article titled "Electroluminescence and Related Topics," "Proceedings of the I.R.E.," volume 43, No. 12, pages 1911–1940 (December 1955). In the usual phenomenon of electroluminescence, selected powdered phosphor materials are placed within the influence of an alternating electric field and are energized by the field to light emission. It has also been known that thin films of electroluminescent phosphors will display the phenomenon of electroluminescence under either A.C. or D.C. potential excitation.

In U.S. Patent No. 2,755,406, dated July 17, 1956 is disclosed a structure wherein only an electroluminescent phosphor is placed in powdered form between two electrodes. Such a construction can normally be excited to light emission by either an A.C. or a D.C. potential. In U.S. Patent No. 2,817,783, dated December 24, 1957 is disclosed an electroluminescent device wherein different regions of a heterogeneous electroluminescent crystal are excited by various combinations of alternating and direct currents to control the light produced by the device.

The usual type of electroluminescent cell is designed for operation only with an alternating or so-called A.C. potential as the phosphor material is normally in powdered form and has admixed therewith a substantial amount of dielectric material, such as equal parts by weight of dielectric and powdered phosphor for example. The purpose of the admixed dielectric material is to prevent any electrical breakdown between the cell electrodes and also to enable much-higher electric fields to be placed across the phosphor to increase its efficiency for the generation of light as well as to increase the light output intensity which can be realized. Such electroluminescent devices are not operable on static or so-called direct current potential alone to produce light, inasmuch as the powdered phosphor particles are at least substantially electrically insulated from one another by the admixed dielectric material. Also, where electroluminescent devices have been fabricated so as to be operable on D.C. potential to produce light, the so-called D.C. electroluminescence has been relatively poor when compared to A.C. electroluminescence. Accordingly, electroluminescent devices are normally designed to be operated only from A.C. potential in order to realize the best efficiency and light output.

In recent years the phenomenon of electroluminescence has been applied to light-amplifying and imaging devices, such as generally disclosed in U.S. Patent No. 2,650,310, dated August 25, 1953. Such devices normally comprise a relatively thick layer comprising photoconductor substance such as cadmium sulfide with a relatively thin layer comprising electroluminescent phosphor material placed adjacent thereto. The photoconductor and electroluminescent layers are sandwiched between two electrodes. On application of an alternating potential across the electrodes with no irradiation of the photoconductor substance, the electric field applied across the phosphor is sufficiently small that little or no light is emitted therefrom. When the photoconductor substance is irradiated with an image composed of X-rays or visible light for example, the electric field applied across phosphor portions adjacent irradiated photoconductor portions is increased greatly, since the photoconductor layer is quite thick compared to the phosphor layer. This causes the adjacent phosphor portions to emit light in accordance with the intensity of the image which is irradiated onto the photoconductor layer. There are several drawbacks to such devices. The decay time of the photoconductor layer is quite slow, being in the order of one to ten seconds. Also, the necessarily-thick photoconductor layers have considerable opacity to the irradiated image which impairs sensitivity. Further, resolution is impaired by the thick photoconductor layers. Accordingly, such devices are not as practical as desired. Very elaborate designs have been fabricated in order to increase the sensitivity and performance of such image-amplifying devices, but efforts in this direction have not been as successful as desired.

The usual electroluminescent cell is insensitive to low A.C. potential excitation. Even with the thinnest-possible cells, the threshold of luminescence normally occurs with applied alternating current potentials of at least about two volts and the usual potential which is applied across the cell electrodes is at least 110 volts. Also, in the usual electroluminescent cell which is designed to be operated with A.C. potential, a light flash is emitted on each alternate half-cycle. The decay time for each light flash for the usual electroluminescent phosphor is in the order of about sixty microseconds. Of course where the applied alternating potential has a frequency greater than about twenty cycles per second for example, the eye blends together the alternate flashes in order to produce the effect of continuing light and the alternate flashes of light are only detectable with sensitive equipment at the higher frequency excitations. As the frequency of excitation increases, however, the electroluminescent phosphor decay time of approximately 60 microseconds limits the applied frequency which can be detected by the electroluminescent device, even with the most sensitive equipment.

There has also existed a need for so-called solid-state amplifying devices as well as solid-state electrical decoupling devices and improved relays.

It is the general object of this invention to avoid and overcome the foregoing and other difficulties of and objections to prior-art practices by the provision of a method for operating an electroluminescent cell with both A.C. and D.C. potential excitation.

It is a further object to provide relative values of A.C. and D.C. potential excitation for operating an electroluminescent cell.

It is another object to provide a method for operating an electroluminescent cell with both A.C. and D.C. potential excitation whereby an enhanced light output can be achieved.

It is an additional object to provide a method for operating an electroluminescent cell whereby very low values of A.C. potential will energize the cell to light emission, which light emission will have a very fast decay time.

It is yet another object to provide a very sensitive electroluminescent image amplifier which is operable from both A.C. and D.C. potentials.

It is still another object to provide an electroluminescent imaging amplifier which has a very fast response.

It is a still further object to provide alternative electroluminecent imaging devices which are adapted to be energized by A.C. and D.C. potential.

It is a further object to provide electroluminescent A.C. or D.C. potential indicators.

It is another object to provide solid-state A.C. or D.C. amplifying devices or electrical decoupling devices, or both.

It is an additional object to provide an electroluminescent A.C.- or D.C.-actuated relay.

It is yet another object to provide alternative and preferred embodiments for the foregoing method for operating an electroluminescent cell.

It is a still further object to provide alternative and preferred embodiments for the foregoing devices incorporating electroluminescent cells, which devices are adapted to be energized by both A.C. and D.C. potential.

The aforesaid objects of the invention, and other objects which will become apparent as the description proceeds, are achieved by providing a method for operating an electroluminescent cell which is operable to emit continuing light under individual excitation by D.C. potential and also under individual excitation by A.C. potential. In the operation of the cell, preselected A.C. and D.C. potentials are applied across the cell electrodes with the magnitudes of the preselected A.C. and D.C. potentials being such that when they are simultaneously applied across the cell electrodes, the resultant light emission is measurably greater than the sum of the resultant light emissions if the preselected A.C. potential and then the preselected D.C. potential are individually applied across the cell electrodes. If the preselected A.C. and D.C. potentials are applied across the cell electrodes other than simultaneously, the preselected D.C. potential is first applied across the cell electrodes to presensitize the phosphor and thereafter the preselected A.C. potential is applied across the cell electrodes. These preselected A.C. and D.C. potentials are expressible in relative values which are different if the phosphor material is in powdered form or is in thin-film form. The foregoing method results in a new phenomenon which may be termed A.C.-D.C. electroluminescence. As based on A.C.-D.C. electroluminescence, there has been provided a process for operating an electroluminescent cell in order to obtain a maximum light enhancement as well as a process for operating an electroluminescent cell which can serve as a detector for very low A.C.-potential values, which very low A.C.-potential values will energize the cell to pulses of light emission which have a very short decay time. In addition, there have been provided very sensitive electroluminescent image amplifiers utilizing photoconductor substances, which image amplifiers can be operated with a very fast time constant if desired, since the photoconductor substance serves mainly to valve the D.C. and need not have a great thickness as compared to the electroluminescent layer. There has also been provided a display device which comprises a plurality of electroluminescent cells, each of which are adapted to be operated by A.C. and D.C. potentials so as to produce an enhanced light output. There is further provided an additional display device which utilizes cross-grid electrodes. Additionally provided are an A.C. or D.C. potential-indicating device, an A.C. or D.C. amplifier or electrical decoupling device, or an A.C.- or D.C.-operable electroluminescent relay, all based on A.C.-D.C. electroluminescence.

For a better understanding of the invention, reference should be had to the accompanying drawings wherein.

Figure 1:
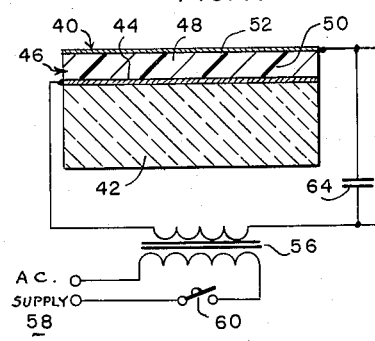
Fig. 1 is a cross-sectional view of an electroluminescent cell incorporating powdered phosphor material and a small amount of admixed dielectric material, with the power supply for this cell shown in diagrammatic form.
Figure 3:
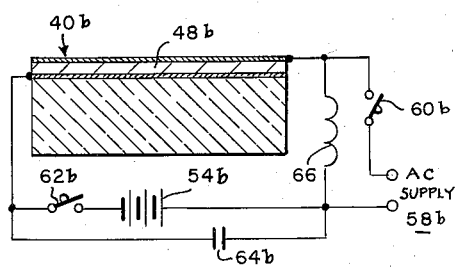
Figure 4:
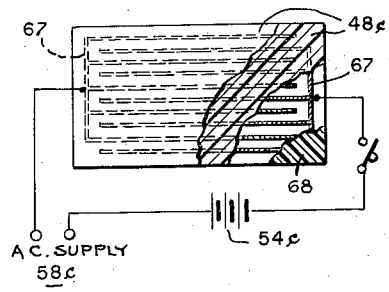
Figure 5:
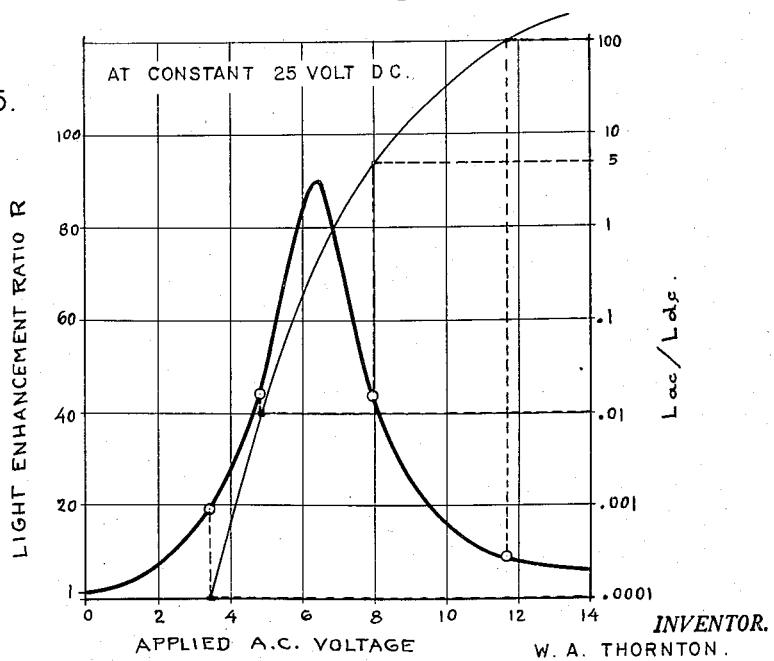
Figure 6:
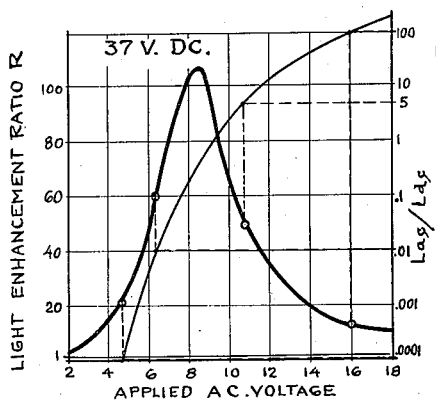
Figure 9:
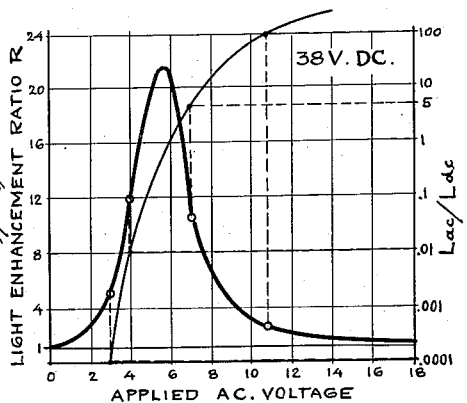
Figure 7:
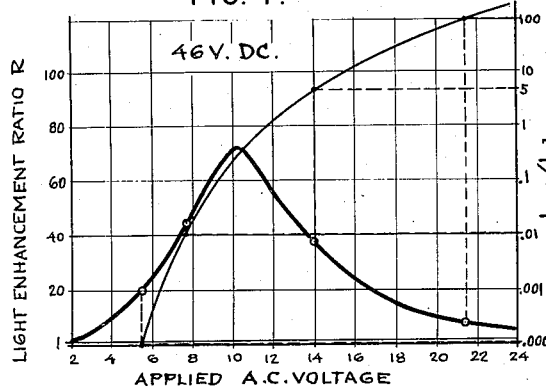
Figure 10:
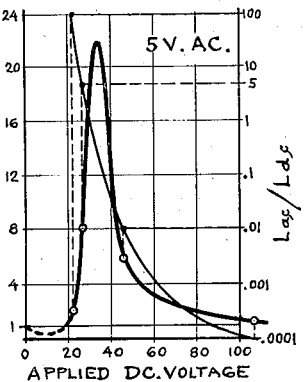
Figure 8:
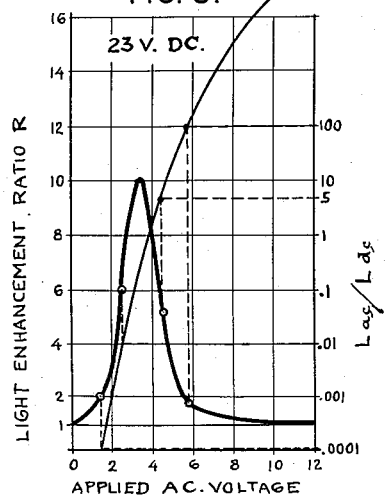
Figure 15:
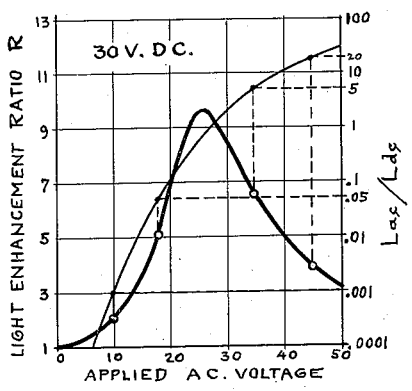
Figure 16:
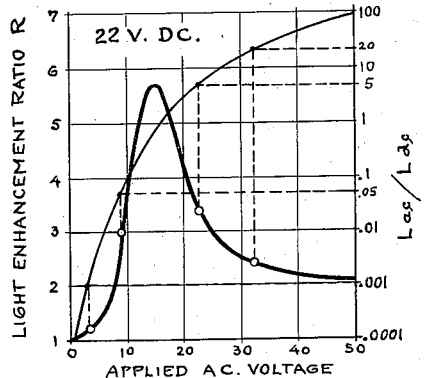
Figure 17:
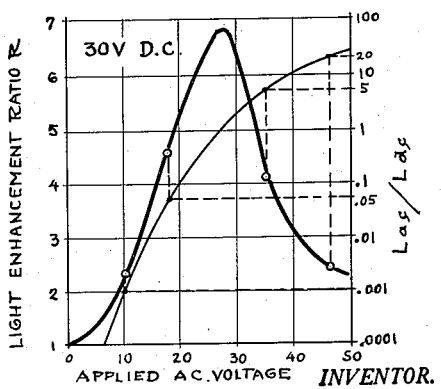
Figure 18:
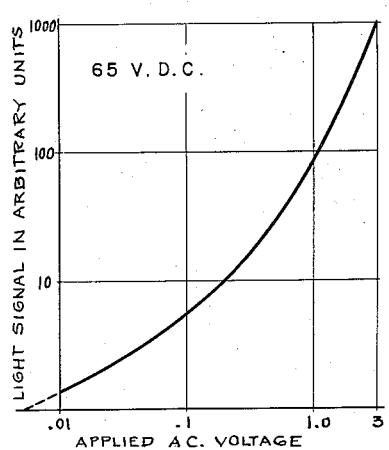

Fig. 3 corresponds to Fig. 1 except that the phosphor is in thin-film form, with the power supply for this cell shown in diagrammatic form;

Fig. 4 is a plan view, partly broken away, of an electroluminescent cell incorporating grid-mesh type electrodes, with the power supply for the cell shown in diagrammatic form;

Fig. 5 illustrates a graph of light enhancement ratio (R) versus applied A.C. voltage for a cell incorporating a specified electroluminescent phosphor material, with the simultaneously-applied D.C. voltage fixed at one value;

Fig. 6 is a graph similar to Fig. 5 and illustrates the operating characteristics for the same cell with the simultaneously-applied D.C. voltage fixed at an increased value;

Fig. 7 is a graph similar to Figs. 5 and 6 and was taken for the same cell with the simultaneously-applied D.C. voltage fixed at a still-greater value;

Fig. 8 illustrates a graph of light enhancement ratio (R) versus applied A.C. voltage for another electroluminescent phosphor material, with the simultaneously-applied D.C. voltage fixed at a comparatively low value;

Fig. 9 is a graph similar to Fig. 8 and illustrates the operating characteristics for the same cell with the simultaneously-applied D.C. voltage fixed at a greater value;

Fig. 10 is a graph of light enhancement ratio (R) versus applied D.C. voltage for the same cell as utilized in obtaining the curves shown in Figs. 8 and 9, with the A.C. voltage fixed and the D.C. voltage varied;

Figs. 11 through 14 correspond to Figs. 5 through 9 except that the powdered electroluminescent phosphors incorporated into the cells utilized in obtaining these performance curves were all different;

Figs. 15 through 17 correspond to Figs. 5–9 and 11–14 except that the phosphor materials utilized in obtaining each of these curves were all different and were in thin-film form;

Fig. 18 is a graph of light signal vs. applied A.C. potential with the applied D.C. potential fixed, illustrating the sensitive nature of the cells to very low values of A.C. potential.

Figure 19:
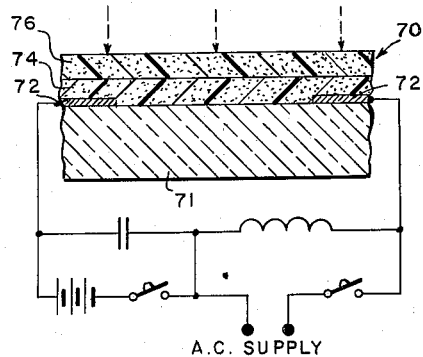
Figure 21:
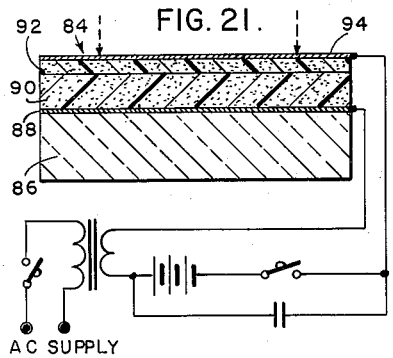
Figure 20:
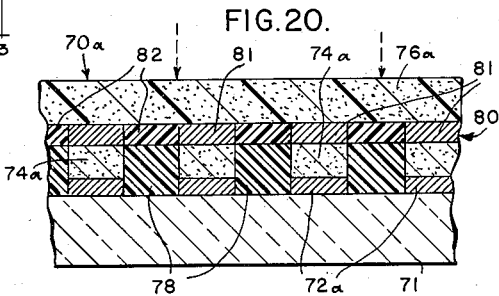
Figure 22:
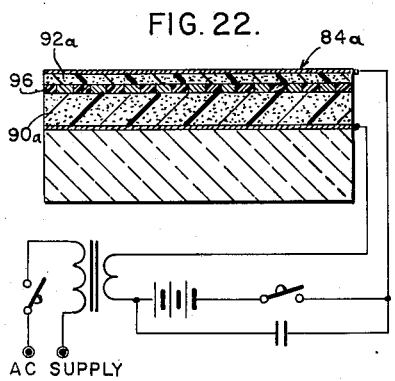
Figure 23:
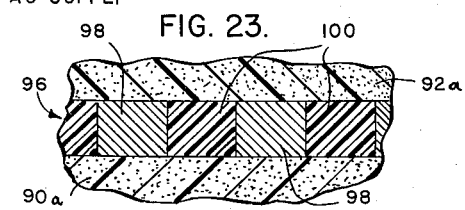
Figure 24:
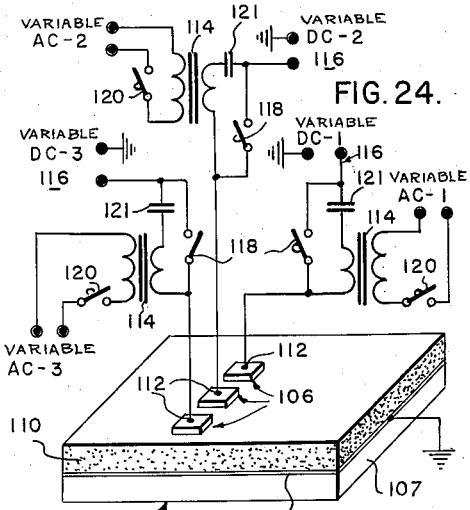
Figure 25:
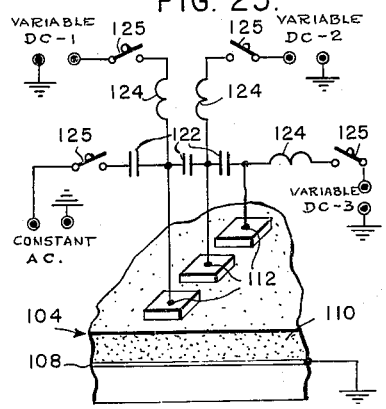
Figure 26:
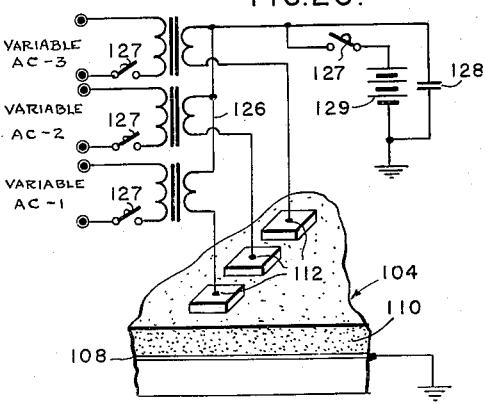
Figure 27:
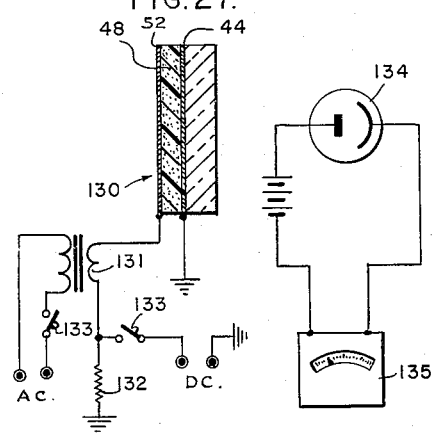
Figure 28:
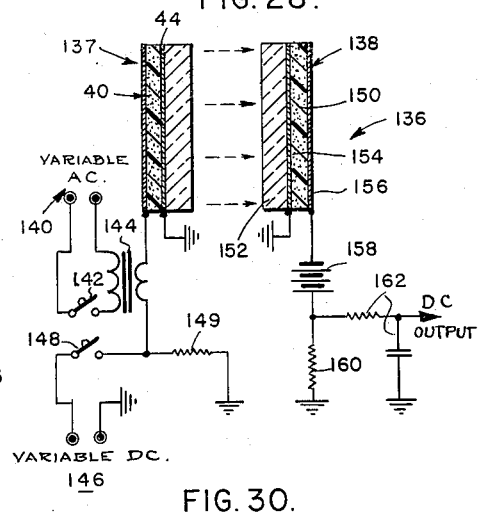
Figure 29:
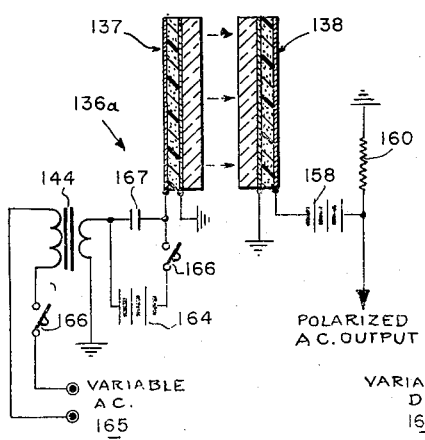
Figure 30:
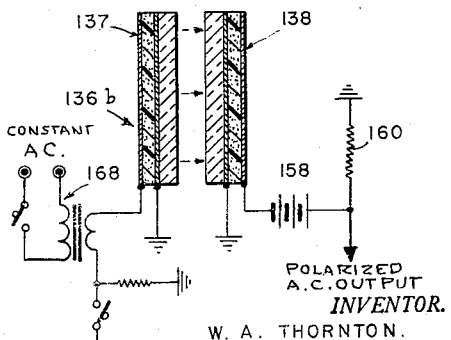

Fig. 19 illustrates in cross-sectional view an elemental section of one type of image amplifier, with the energizing power supply shown in diagrammatic form;

Fig. 20 is an expanded cross-sectional view of an alternative embodiment of the image-amplifier as shown in Fig. 19 wherein additional insulators and an additional light-shielding layer are utilized and the elemental electrodes are spaced more closely;

Fig. 21 illustrates a cross-sectional view of another type of image amplifier, with the power supply therefor shown in diagrammatic form;

Fig. 22 illustrates an alternative embodiment of an image amplifier wherein a light-shielding means is incorporated between the phosphor and photoconductor layers, with the power supply for this image amplifier shown in diagrammatic form;

Fig. 23 is a fragmentary, expanded, cross-sectional view of one embodiment of a light-shielding means, as utilized in the image amplifier shown in Fig. 22;

Fig. 24 is a diagrammatic view of an imaging device and the power supply therefor;

Fig. 25 is a fragmentary enlargement of a portion of the imaging device as shown in Fig. 24, with an alternative embodiment of the power supply therefor shown in diagrammatic form;

Fig. 26 corresponds to Fig. 25 but illustrates in diagrammatic form a still-further alternative power supply;

Fig. 27 is a diagrammatic view of an A.C. or D.C. potential-indicating device;

Fig. 28 is a diagrammatic view of an A.C. or D.C. amplifier or electrical decoupler, which has variable A.C. and variable D.C. inputs and a D.C. output;

Fig. 29 corresponds to Fig. 28 except that the device has a variable A.C. input and an A.C. output;

Fig. 30 corresponds to Fig. 28 except that the device has a variable D.C. input and an A.C. output;

Fig. 31 corresponds to Fig. 28 except that the device is provided with a variable A.C. input and with both A.C. and D.C. outputs;

Fig. 32 illustrates in diagrammatic form an A.C. or D.C. actuated relay;

Fig. 33 generally corresponds to Fig. 32 except that the relay has plural inputs and operates in conjunction with a phototube;

Fig. 34 illustrates in diagrammatic form a further-alternative imaging device wherein the A.C. input is variable and the D.C. input is constant;

Fig. 35 corresponds to Fig. 34 except that the A.C. input is constant and the D.C. input is variable;

Fig. 36 corresponds to Fig. 34 except that both A.C. and D.C. inputs are variable.

With specific reference to the form of the invention illustrated in the drawings, in Fig. 1 is shown the cross section of an electroluminescent cell 40 which generally comprises a foundation glass member 42 having coated thereover a thin, light-transmitting, electrically conducting layer 44 which serves as a first electrode. Coated over the first electrode 44 is a layer 46 comprising admixed electrolluminescent phosphor material 48 and dielectric material 50. Coated over the phosphor-dielectric layer 46 is a second electrode 52 which as an example is a thin layer of vacuum-metallized aluminum or silver. The phosphor material 48 is in powdered form and the state of division of the phosphor powder is not critical and can vary considerably as is known. As an example the powdered phosphor 48 has an average particle size of about seven microns. The phosphor material may comprise any electroluminescent phopshor, that is, any phosphor which is excitable by an alternating electric field to emit visible light and any of the powdered electroluminescent phosphors treated in detail hereinafter are suitable. The admixed dielectric material 50 is limited in amount with respect to the phosphor 48 in order that electrical contact is maintained between at least a substantial portion of the individual phosphor particles so that the electroluminescent cell 40 can be excited to continuing light emission under individual excitation by D.C. potential. The admixed dielectric 50 is desirably present in sufficient amount, however, in order to fill interstices between the individual phosphor particles so that when the electrode 52 is vacuum metallized onto the phosphor-dielectric layer 46, interstices between the individual phosphor particles will not be filled with the vacuum-metallized electrode material as this might tend to short out the cell 40. As a practical matter, from 1% to 10% by weight of the phosphor of the admixed dielectric material is utilized, although even this range can be extended. As a specific example, 5% by weight of the phosphor of admixed dielectric has been found to be very suitable. The dielectric 48 comprises any light-transmitting insulating material having a reasonably high dielectric constant, such as polyvinyl-chloride acetate, methyl methacrylate or polystyrene for example. The foundation 42 comprises any light-transmitting substance such as glass for example and the first electrode 44 is desirably fabricated of a light-transmitting, electrically conductive material such as tin oxide, as is usual in electroluminescent cells. Other metallic oxides may be substituted in place of the tin oxide, such as titanium or indium oxides. If the second electrode 52 is light transmitting, the foundation 42 and first electrode 44 need not be light transmitting, but can be fabricated of a metal plate for example. The second electrode 52 desirably comprises the vacuum-metallized material although a light-transmitting, electrically-conductive material such as copper iodide can be substituted for the aluminum for example. Such copper iodide electrode layers are formed by vacuum metallizing a thin layer of copper onto the phosphor-dielectric layer 46 and thereafter passing the cell through iodine vapor until the copper is converted to copper iodide to become light-transmitting in nature.

The cell 40 is adapted to be energized by preselected A.C. and D.C. potentials, with the magnitudes of the applied potentials varying in accordance with the cell performance desired and with the thickness of the cell in order to achieve the desired field intensities. In the embodiment as illustrated, the phosphor-dielectric layer 46 has a thickness of about 10 microns and unless otherwise indicated this cell thickness will be utilized throughout the description in establishing performance charactteristics for the A.C.-D.C. operable cells incorporating powdered phosphors. The phosphor-dielectric layer thickness of 10 microns is in no way critical and can be varied over a wide range.

Excitation of the cell 40 with A.C. and D.C. potentials can be effected by any suitable circuit and one circuit embodiment is shown in diagrammatic form in Fig. 1, wherein a preselected D.C. potential source 54 such as a battery with a terminal voltage of 40 volts, for example, is electrically connected across the cell electrodes 44 and 52. Connecting in series with the D.C. potential source through a transformer 56 is a source 58 of A.C. potential, which as an example delivers 6 volts R.M.S., 1000 c.p.s. to the electrodes 44 and 52. The frequency of the A.C.-energizing potential is not critical and by way of example can be varied from 15 cycles per second to 500 kilocycles per second. For some conditions of operation, it may be desirable first to apply the D.C. potential to presensitize the cell and thereafter apply the preselected A.C. potential across the cell electrodes. For such operation, a switch 60 is provided in the A.C. potential supply line and an additional switch 62 is provided for the D.C. potential supply 54. An additional suitable capacitor 64 parallels the D.C. potential supply 54 so that the preselected A.C. energization potential can if desired be applied across the cell electrodes without the simultaneous application of the preselected D.C. potential. In the usual operation of the cell, however, the A.C. and D.C. potentials are applied simultaneously across the cell electrodes.

Figure 2:
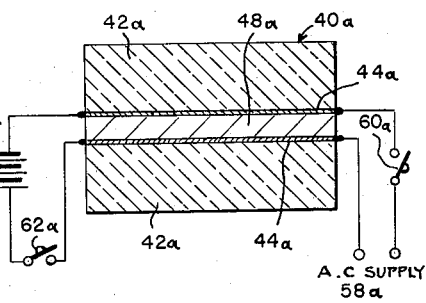
Fig. 2 is a cross-sectional view of an electroluminescent cell wherein powdered electroluminescent phosphor material is sandwiched between two electrodes, with the power supply for the cell shown in diagrammatic form.

In Fig. 2 is shown an alternative embodiment 40a for the cell which corresponds to the cell as shown in Fig. 1 except that the phosphor material 48a is not admixed with dielectric material, but is compressed between two glass foundations 42a, each having coated thereover a layer 44a of light-transmitting, electrically conducting tin oxide for example. In the illustrated embodiment the thickness of the phosphor layer 48a corresponds to the thickness of the phosphor-dielectric layer 46 as shown in Fig. 1 and this thickness can be varied considerably. In the embodiment as shown in Fig. 2, the A.C. potential supply 58a and D.C. potential supply 54a as used to energize the cell 40a are connected in parallel across the cell electrodes 44a and are desirably provided with individual switches 60a and 62a in case the preselected A.C. and D.C. energizing potentials are to be applied across the cell electrodes other than simultaneously.

The cell embodiment 40b as shown in Fig. 3 corresponds to the cell embodiments as shown in Figs. 1 and 2 except that the phosphor is applied in the form of a thin, continuous film 48b, which has a thickness of four microns for example. The thickness of the thin phosphor film 48b is not critical and may vary over a wide range. Such thin films may be deposited by a technique as described in Feldman and O'Hara article appearing in "Journal of the Optical Society of America," vol. 47, No. 4, pages 300–305 (April 1957). The preselected A.C. and D.C. energizing potentials can vary over a wide range as described hereinafter and as a specific example are of the same potential values as described for the embodiment shown in Fig. 1. In the alternative energizing power supply as shown in Fig. 3, the source 54b of D.C. potential and source 58b of A.C. potential are connected in series across the cell electrodes and each of the individual potntial sources is respectively paralleled with a suitable capacitor 64b and an inductance 66 in order that the A.C. and D.C. potentials can be individually applied across the cell electrodes if desired. Suitable switches 60b and 62b are provided in the A.C. and D.C. supply circuits.

In the cell embodiment 40c as shown in Fig. 4, the cell electrodes 67 have the form of a grid mesh, such as described in Fig. 3 of U.S. Patent No. 2,684,450, dated July 20, 1954. These cell electrodes can be formed by vacuum-metallizing conducting strips such as copper, for example, onto a plastic foundation 68 and thereafter the phosphor 48c, or phosphor admixed with a small amount of admixed dielectric as the case may be, sprayed over the cell electrodes. The phosphor or phosphor-dielectric can comprise any electroluminescent phosphor as in the previous cell embodiments. In the case of the admixed dielectric, the amount of admixed dielectric should be relatively small, as indicated in the description of the embodiment shown in Fig. 1, in order that the cell can emit continuing light under individual excitation by D.C. potential. In the alternative embodiment of the energizing power supply as shown in Fig. 4, the A.C. potential source 58c and D.C. potential source 54c are connected in series and as an example, the A.C. and D.C. potential sources are as specified in the description of the embodiment as shown in Fig. 1.

While various embodiments for cell power supplies have been shown in Figs. 1 through 4, it should be understood that the circuitry arrangements for the preselected A.C. and D.C. potentials may be varied considerably, as long as both the A.C. and D.C. potentials are adapted to be applied across the cell electrodes. Also, while various electrode constructions have been illustrated and described in Figs. 1 through 4, other various electrode constructions are also possible, such as described in U.S. Patent No. 2,765,419, dated October 2, 1956 or U.S. Patent No. 2,774,004, dated December 11, 1956 for example. The common feature of all of the cell embodiments as shown in Figs. 1 through 4 is that each of the cells can emit continuing light under individual excitation by D.C. potential and under individual excitation by A.C. potential. Also, each of these cells have spaced electrodes, whatever their form, and material comprising electroluminescent phosphor between the spaced electrodes.

In Fig. 5 are plotted the performance characteristics for a cell generally fabricated in accordance with the construction as described for the embodiment shown in Fig. 1. The powdered electroluminescent phosphor material utilized was a blue-emitting zinc sulfide, activated by copper. As an example, such a phosphor is prepared by admixing 500 grams of zinc sulfide with 15 grams of sulphur and 5.4 grams of copper acetate. This admixture is fired in a partially-covered container in a nitrogen atmosphere at a temperature of 950° C. for about 1½ hours. Thereafter the phosphor is lightly crushed and desirably the phosphor is refired in a similar manner. The prepared phosphor is incorporated into the cell with 5% by weight, for example, of admixed dielectric material such as specified hereinbefore. The phosphor and admixed dielectric are applied by conventional techniques to a thickness of 10 microns for example. In the curve shown in Fig. 5 the ordinate values on the left represent the light enhancement ratio (R). This is the ratio or quotient of the light intensity emitted by the cell when it is simultaneously energized by the preselected D.C. voltage and A.C. voltage, divided by the sum of the individual light intensities resulting when the cell is individually energized by the same preselected D.C. potential excitation and the same preselected A.C. potential excitation. Thus R=Light (ac and dc is simultaneously applied)÷[Light (ac)+Light (dc)]. The ordinate values on the right are plotted to log scale and represent the light intensity under the individual preselected A.C. excitation divided by the light intensity under the individual preselected D.C. excitation, in other words Lac/Ldc. The heavy curve in Fig. 5 represents the ratio (R) versus applied A.C. volts and the lighter curve in Fig. 5 represents the quotient of light intensity under individual A.C. excitation divided by the light intensity under the individual D.C. excitation (Lac/Ldc). In obtaining the curves as shown in Fig. 5, a preselected and constant D.C. potential of 25 volts was applied across the cell electrodes. Simultaneously with this indicated D.C. potential, a 1000 c.p.s. A.C. potential as per the abscissal values was applied across the cell electrodes in an increasing manner. All A.C. potentials referred to herein are expressed in R.M.S. volts. As an example, the light intensity emitted by the cell under individual excitation by 25 volts D.C. was about 1000 times greater than the light intensity emitted by the cell under individual excitation by 4.2 volts A.C. In other words, the ratio of Lac/Ldc was about 0.001. When such A.C. and D.C. potentials were simultaneously applied across the cell electrodes, the light enhancement ratio (R) was approximately 30. As a further example, the light intensity emitted by the cell under individual application of 11.7 volts A.C. was approximately 100 times greater than the light intensity under the indicated D.C. potential excitation when individually applied across the cell electrodes. In other words, the ratio of Lac/Ldc was approximately 100. When these A.C. and D.C. potentials were simultaneously applied across the cell electrodes, the light enhancement ratio (R) was approximately 9. The light-enhancement ratio (R) at least approaches the flatter portions of the curve of "R vs. A.C. voltage" as shown in Fig. 5, when the ratio or quoitent or Lac/Ldc is less than about 0.0001 or more than about 100. Thus for more-sensitive operation, it is desirable that the preselected A.C. and D.C. potentials have such values that the ratio or quotient of Lac/Ldc is from about 0.0001 to about 100. For maximum light-enhancement ratios (R), the ratio of Lac/Ldc should be from about 0.01 to about 5. As noted hereinafter, for some applications it may be desirable to exceed even the ratio of Lac/Ldc=100. The maximum light enhancement ratio (R), which is about 90 for this specific example, occurs when the ratio of Lac/Ldc is about 0.4. In other words, a maximum light enhancement ratio is observed for this specific example when 25 volts D.C. and 6.5 volts A.C. are simultaneously applied across the cell electrodes. These specific voltage values will hold true only for the specific cell embodiment as described and if the phosphor-dielectric layer is made thicker or thinner, the voltages as required to achieve an equivalent light enhancement ratio (R) will be correspondingly increased or decreased as the case may be. The desired and preferred ratios of Lac/Ldc required to obtain a desired or preferred light enhancement ratio (R) will still hold true, however, whatever the cell thickness. In addition, the frequency of the A.C. potential does not affect to any appreciable degree the aforenoted desired and preferred ratios or quotients of Lac/Ldc.

The curves in Fig. 6 are similar to those in Fig. 5 and were taken for the identical cell using the same phosphor material, except that the D.C. voltage which was applied across the cell electrodes was increased to 37 volts. With this increased D.C. voltage, the maximum "R" obtained was slightly greater than 100. The desired and preferred ratios of Lac/Ldc remain the same however.

The curves shown in Fig. 7 correspond to those shown in Figs. 5 and 6 and were taken with an identical cell using the same phosphor material, except that the applied D.C. voltage was increased to 46 volts. As illustrated in this curve, the maximum light enhancement ratio (R) decreases slightly to about 70 and the curve of "R versus applied A.C. potential" is generally flattened and extended.

In Fig. 8 are shown performance characteristics for a cell constructed in the same manner as the cell which was utilized in taking the data presented in Figs. 5 through 7, except that the phosphor was a green-emitting phosphor comprising zinc sulfide activated by copper with a chlorine coactivator. As an example, such a phosphor is prepared by admixing 1000 grams of zinc sulfide with 30 grams sulphur, 12.8 grams copper acetate and 4.5 grams ammonium chloride. This admixture is fired in a partially-closed container in a nitrogen atmosphere at a temperature of about 950° C. for about 100 minutes. Thereafter the phosphor is slightly crushed, 3 grams of sulphur are added to the phosphor and it is refired in a similar manner. The ordinate and abscissa values as well as the curves in Fig. 8 correspond to those as shown in Figs. 5 through 7, with a constant D.C. potential of 23 volts. As in the case of the cell utilized in taking the curves shown in Figs. 5 through 7, for purposes of most-sensitive response, the desired ratio of Lac/Ldc is from about 0.0001 to about 100 and preferably is from about 0.01 to about 5.

The curve in Fig. 9 was taken for an identical cell construction and an identical phosphor as was used in taking the curves shown in Fig. 8, except that the D.C. voltage was increased to 38 volts. Under this condition of operation, the maximum light enhancement ratio (R) is about 22 and the desired and preferred values of Lac/Ldc are as indicated in the description of the curves as shown in Fig. 8.

In Fig. 10 are shown performance curves taken for the same cell with the same phosphor material as was used in taking the curves as shown in Figs. 8 and 9. Instead of maintaining preselected D.C. potential at a constant value, however, the A.C. potential was maintained at a constant value of 5 volts, 1000 c.p.s. Similar curves could also be taken for any of the electroluminescent cells embodying the various electroluminescent phosphor materials as described herein, but it is more convenient from the standpoint of a graphical representation to hold the D.C. voltage constant and to vary the A.C. voltage. The curves as shown in Fig. 10, however, do illustrate features of the phenomenon of A.C.-D.C. electroluminescence. For example, at comparatively low D.C. potential values such as less than are required to produce average field strengths of about two volts per micron, a quenching effect occurs and the light enhancement ratio (R) actually becomes less than unity. In other words, "R" which is expressed by L (both ac and dc)/Lac+Ldc becomes less than unity. Thus in order for the instant phenomenon to have utility, the D.C. voltage which is applied across the cell electrodes should be sufficient to generate across the phosphor an electric field having an average intensity of at least about two volts per micron. This minimum D.C. field intensity holds true for all different electroluminescent phosphors observed. It is also interesting to note that in the case of powdered phosphors, this quenching effect can occur even when the D.C. voltage is comparatively high with respect to the applied A.C. voltage.

Considering the theoretical aspects of the phenomenon of A.C.-D.C. electroluminescence, it is convenient first to consider a simplified explanation of the mechanism of so-called A.C. electroluminescence and to consider a single phosphor crystal. In the phenomenon of A.C. electroluminescence, when one phase of the A.C. exciting potential is applied across a single phosphor crystal, luminescent centers proximate the then-negative portions of the crystal will be emptied of electrons and these electrons will progress toward the positive side of the crystal, where a substantial portion of the moving electrons are trapped. In the region of the emptied luminescent centers, very high fields exist and the field across the rest of the crystal is relatively small. When the field is reversed by the next-succeeding phase of the exciting A.C. potential, electrons in the traps and in the luminescent centers proximate the now-negative side of the crystal will be driven toward the now-positive side of the crystal. The portions of the crystal proximate the now-positive side contain a plurality of previously-emptied luminescent centers and because of the low field strength existing in this region after the field reversal, the electrons are traveling relatively slowly as they pass this now-positive region of previously-emptied luminescent centers. The relatively slow electron velocity allows a substantial portion of the electrons to recombine with luminescent centers to produce light. On the next field reversal, the same phenomenon is repeated and so on, which results in the production of a series of flashes of light occurring once each half cycle of the applied alternating field, which flashes the eye blends together to produce the effect of continuing light. While the foregoing explanation of A.C. electroluminescence has been given in terms of a single crystal, it should be understood that this apparently occurs for each individual crystal of the powdered phosphor.

In explanation of the mechanism of so-called D.C. electroluminescence, it is convenient again to consider a single crystal. When the electric field is first applied across a crystal, the electrons in the luminescent centers proximate the negative side of the crystal are driven toward the positive side of the crystal where they are trapped. There will always be some current flow through the crystal, since such crystals are not perfect insulators, but as the electrons pass from the negative side of the crystal to the positive side, only a few of the electrons will combine with the luminescent centers which have been emptied in the region proximate the positive side of the crystal in order to produce light. This is because as these electrons pass the region of emptied luminescent centers, they do so with a very high velocity because of the high field strength in this crystal region. Accordingly, the efficiency and light output of D.C. electroluminescence is comparatively poor as compared to A.C. electroluminescence, since only a few of the electrons which pass the crystal have an opportunity to combine with emptied luminescent centers to produce light.

In the instant phenomenon which may be termed A.C.-D.C. electroluminescence, when the D.C. voltage is applied, the crystal in essence polarizes so as to empty luminescent centers in the region of the crystal proximate the negative electrode and to trap electrons in other regions of the crystal. As the simultaneously-applied A.C. reverses its field, so as to oppose the D.C. field, a portion of the traps are emptied and the electrons from these emptied traps are caused to travel toward the "D.C. negative electrode" region of the crystal (which is positive with respect to the A.C.). This "D.C. negative electrode" region of the crystal contains many previously-emptied luminescent centers. An appreciable number of the electrons which are caused to travel toward this region of the crystal by the opposing A.C. field will recombine with the emptied luminescent centers, since the opposing fields result in a comparatively low field strength in the region of the crystal which contains the emptied luminescent centers. As noted before, low field strengths in the region of emptied luminescent centers allow for recombination of electrons with such emptied luminescent centers to produce light. On the next succeeding half-cycle of the preselected A.C. potential, the luminescent centers in the region of the negative A.C. and D.C. portions of the crystal will again be emptied. The experimental observation which supports this theoretical explanation of the instant phenomenon of A.C.-D.C. electroluminescence is the fact that in A.C.-D.C. electroluminescence only one flash of enhanced light is observed for each full cycle of the preselected A.C. potential excitation and this occurs when the A.C. and D.C. fields are in opposition. In A.C. electroluminescence, in contrast, a flash of light is observed for each half cycle of the energizing A.C. potential. Thus the phenomenon of A.C.-D.C. electroluminescence is completely different from either A.C. electroluminescence per se or D.C. electroluminescence per se. The instant phenomenon occurs most efficiently when the applied D.C. potential is greater than the applied A.C. potential. When the applied A.C. potential exceeds the applied D.C. potential by an appreciable amount, the light output from the cell becomes that of A.C. electroluminescence per se.

Figure 11:
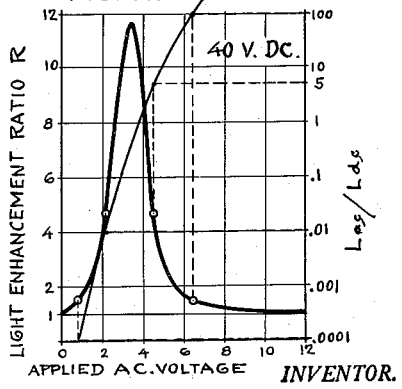

In Fig. 11 is shown a curve which corresponds to the curves shown in Figs. 5 through 9 except that the phosphor is different and comprises a blue-green emitting zinc sulfide, copper activated and chlorine-coactivated phosphor. The constant D.C. potential was 40 volts. As an example, such a phosphor is prepared by admixing 500 grams of zinc sulfide with 15 grams sulphur, 0.6 gram copper chloride and 4.8 grams of copper acetate. The raw-mix constituents are fired in a nitrogen atmosphere in a partially-closed container at a temperature of 950° C. for 90 minutes. Thereafter the fired constituents desirably are lightly crushed and refired in a similar manner.

Figure 12:
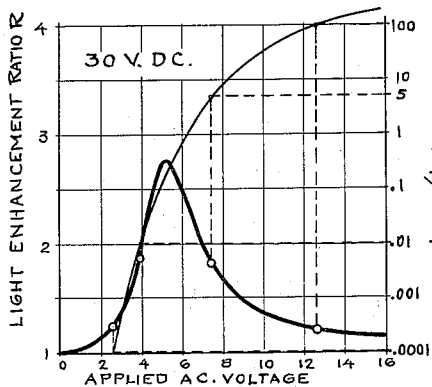

The curves shown in Fig. 12 correspond to those shown in Fig. 11 and were taken for a zinc-sulfide phosphor activated by copper and coactivated by chlorine, which phosphor has a more blue emission than the phosphor used in taking the curves shown in Fig. 11. The constant D.C. potential was 30 volts. As an example, such a phosphor is prepared by admixing 1000 grams of zinc sulfide with 30 grams of sulphur, 9.5 grams of copper acetate and 0.40 gram of ammonium chloride. This raw mix is fired at 950° C. in a partially-closed container in a nitrogen atmosphere for 100 minutes. Thereafter it is desirably lightly crushed, 3 grams of sulphur are added to the lightly-crushed phosphor and it is refired as in the initial firing step.

Figure 13:
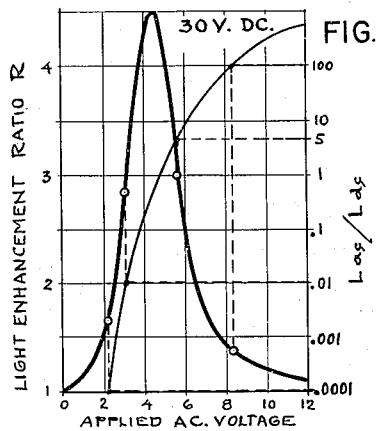

Fig. 13 illustrates performance curves similar to those as shown in Figs. 11 and 12 except that the phosphor utilized was a yellow-emitting zinc sulfo-selenide, activated by copper and coactivated by chlorine and the constant D.C. potential was 30 volts.

Figure 14:
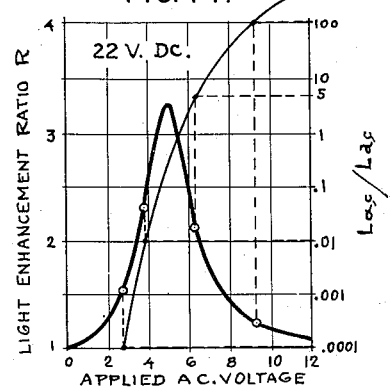

Fig. 14 is also similar to the curves as shown in Figs. 11–13, except that the phosphor from which the curves were prepared was a yellow-emitting zinc sulfide activated by copper and manganese and coactivated by chlorine. The constant D.C. potential was 22 volts. As an example, such a phosphor is prepared by admixing 1000 grams of zinc sulfide with 20 grams of sulphur, 9.5 grams copper acetate, 0.70 gram ammonium chloride and 40 grams manganese carbonate. The raw mix is fired in a partially-closed container in a nitrogen atmosphere at a temperature of 1100° C. for about 2 hours. For optimum output, the phosphor is desirably refired.

In all of the foregoing curves shown in Figs. 11–14, the curves of light enhancement ratio (R) vs. A.C. volts at least start to level out when the ratio of Lac/Ldc is about 0.0001 on the low side and about 100 on the high side. Also, in all of these curves, the best light enhancement ratios (R) occur when Lac/Ldc is from about 0.01 to about 5.

The instant phenomenon of A.C.-D.C. electroluminescence is also observed for electroluminescent phoshors which are formed as thin, continuous films, such as shown in Fig. 3. The thickness of such films is not critical and may vary considerably. As an example, each of the thin films as discussed hereinafter were four microns thick. In Fig. 15 are shown performance curves for a thin film of green-emitting zinc sulfide phosphor, activated by copper and coactivated by chlorine. The constant D.C. potential was 30 volts. The phosphor corresponds in initial preparation to the phosphor as was used in taking the curves shown in Figs. 8, 9 and 10. As an example, after this phosphor is prepared as indicated hereinbefore, it is placed into a boat and evaporated in vacuum at a temperature of 1100° C. for 15 minutes onto a foundation. This forms a thin, continuous film of the phosphor on the foundation. Thereafter the thin film is fired in an inert gas such as nitrogen at a temperature of 750° C., for example, for a period of 15 minutes. The longer the initial evaporation period, the "thicker" the thin film. Where thin films of phosphor are utilized, the curves of light enhancement ratio (R) vs. A.C. volts at least start to level out when the ratio or quotient of Lac/Ldc is from about 0.001 to about 20 and best light-enhancement ratios are realized when the quotient of Lac/Ldc is from about 0.05 to about 5.

In Fig. 16 are shown performance characteristics for a cell fabricated in a manner similar to the cell used in preparing the curves shown in Fig. 15, except that the thin-film phosphor utilized was a yellow-emitting zinc sulfide, activated by manganese. The constant D.C. potential was 22 volts. As an example, the phosphor is prepared by admixing one mole of zinc sulfate with 0.02 mole of manganese sulfate. The mixture is thereafter reacted with hydrogen sulfide to produce zinc sulfide and manganese sulfide and this mixture is fired at a temperature of 1100° C. in an inert atmosphere for 1 hour. The prepared phosphor is thereafter evaporated in accordance with the technique as was used in preparing the phosphor thin film as included under the description of Fig. 15.

In Fig. 17 are shown the performance characteristics for an electroluminescent cell similar to the cells used in preparing the curves shown in Figs. 15 and 16, except that the phosphor was the yellow-emitting zinc sulfide, activated by copper and manganese and coactivated by chlorine as specified hereinbefore. The constant D.C. potential was 40 volts. In all of the curves shown in Figs. 15–17, the curves of light enhancement ratio (R) vs. A.C. volts at least start to level out when the ratio of Lac/Ldc is from about 0.001 to about 20 and the best light-enchancement ratios are observed when Lac/Ldc is from about 0.05 to about 5.

The foregoing examples of suitable electroluminescent phosphors are numerous, but are not intended to be limiting. The instant phenomenon of A.C.-D.C. electroluminescence has been observed for all electroluminescent phosphors tested, whether the phosphors have been in powdered form or in thin-film form. It should be noted that while the foregoing performance curves have been presented with either the preselected A.C. or D.C. potentials maintained at a fixed value, both of the preselected A.C. and D.C. potentials may be varied simultaneously. As an example, reference is made to a cell such as disclosed under the description of Figs. 8 through 10. In such a cell, the D.C. potential can be varied from 20 volts to 100 volts and the A.C. potential simultaneously varied from 3 to 11 volts R.M.S. for example. Similarly, both the preselected A.C. and D.C. potentials can likewise be varied simultaneously for all of the examples as given hereinbefore.

For some special applications, it is desirable to operate on portions of the curves of "R versus A.C. volts" where the ratio of Lac/Ldc is less than about 0.0001 in the case of powdered phosphors and less than about 0.001 in the case of thin-film phosphors. For example, reference is made to Fig. 6 wherein the light-enhancement ratio (R) is about 20 even after the ratio of Lac/Ldc is less than 0.0001. Also, in Fig. 17 for example, the light-enhancement ratio (R) is still appreciable even after the ratio of Lac/Ldc is less than 0.001. In the case of powdered phosphors, the light-enhancement ratios (R) still has utility for some special applications where the preselected A.C. potential, as expressed in R.M.S. volts, is at least 0.03 of the preselected D.C. potential. In the case of thin-film phosphors, for some applications the light-enhancement ratio achieved still has utility where the preselected A.C. potential, expressed in R.M.S. volts, is at least about 0.1 of the preselected D.C. volts.

For some special applications, it is desirable to operate on portions of the curves of "R versus A.C. volts" where the ratio of Lac/Ldc is greater than about 100 in the case of powdered phosphors and greater than about 20 in the case of thin-film phosphors. For example, reference is made to Fig. 6 wherein the light enhancement ratio (R) is still greater than 10 even after the ratio of Lac/Ldc exceeds 100. Even though the light enhancement ratio is small, at least as compared to its maximum value, the total light emitted by such a cell will be comparatively large. The main limitation to increasing the ratio of Lac/Ldc considerably beyond the values of about 100 in the case of powdered phosphors and about 20 in the case of thin-film phosphors is the tendency for electrical breakdown across the cell electrodes. In the usual cell construction which incorporates powdered phosphors, electrical breakdown between the cell electrodes is normally approached when the R.M.S. value of the preselected A.C. potential is about 0.5 of the value of the preselected D.C. potential, which D.C. potential should always have such magnitude as to generate an average electric field between the cell electrodes of at least about two volts per micron. In the case the cell construction incorporates thin-film phosphors, electrical breakdown is normally approached when the R.M.S. value of the A.C. potential is about 1.5 of the preselected D.C. potential. Of course with special cell constructions even these R.M.S. A.C. potential and D.C. potential relative values can be exceeded somewhat without incurring electrical breakdown across the cell electrodes. One example of such a special cell construction is disclosed in application S.N. 711,095, filed January 24, 1958 and owned by the present assignee, wherein an additional layer of poor-conducting material is interposed between the cell electrodes in order to inhibit any tendency for electrical breakdown therebetween.

In the case of phosphor thin films, no quenching effect of the light-enhancement ratio (R) is observed when the D.C. field becomes quite small with respect to the A.C. field as with powdered phosphors, but the ratio "R" approaches unity so as to have no utility. With thin-film phosphors, in order to have a usable "R," the D.C. potential which is applied across the electrodes should be of sufficient magnitude to generate between the electrodes an electric field having an average intensity of at least about two volts per micron, as in the case of powdered phosphors.

In the foregoing illustrations, the preselected A.C. and D.C. potentials have been applied across the cell electrodes simultaneously in order to observe the phenomenon of A.C.-D.C. electroluminescence. It is not necessary that these preselected potentials be applied across the cell electrodes simultaneously. In explanation, reference is made to the mechanism of the A.C.-D.C. electroluminescence as given hereinbefore. If the preselected D.C. potential is first applied across the cell electrodes, this will in essence presensitize the electroluminescent phosphor by emptying luminescent centers in the negative electrode region of each crystal. Thereafter the applied preselected D.C. potential may be removed. On application of the preselected A.C. potential across the cell electrodes, once each full cycle the trapped electrons will be driven toward the portion of the crystal which contains the emptied luminescent centers. This will result in an enhanced light output having a ratio (R) similar to that observed under the simultaneous application of A.C. and D.C. The duration of the enhanced light output will depend upon the frequency of the applied A.C. potential as well as the relative intensities of the A.C. and D.C. potentials. In the case the applied A.C. potential is comparatively small as compared to the applied D.C. potential, so as to locate the light enhancement ratio (R) well within the "positive slope" portions of the curves of "R versus A.C. volts" as shown in the preceding figures, the duration of the light enhancement will be comparatively long. Where the applied A.C. potential is quite small with respect to the presensitizing D.C. potential, reasonably large light enhancement ratios (R) have been observed for as much as 30 seconds after the preselected A.C. potential is individually applied across the presensitized electroluminescent cell. Also, the presensitized condition of the electroluminescent phosphor, as effected by individual application of the preselected D.C. potential, can last for a considerable time before the application of the preselected A.C. potential across the cell electrodes. Some light enhancement (R) is still achieved with periods of time as long as ten hours from D.C. potential presensitization to the application of the preselected A.C. potential. In the case the applied A.C. potential is such that the cells are operated within the "negative slope" portions of the curves "R versus A.C. volts" as shown in the preceding figures, the duration of the light enhancement will be quite short and can be as short as 0.01 second for example. Thus where the D.C. field is varied, the so-called "time constant" of the response of the phosphor can be varied over a wide range such as from 0.01 second to 30 seconds, for example. The ability to vary the time constant of the phosphor, where the applied D.C. potential is varied with respect to the applied A.C. potential, is useful for some applications as will be described hereinafter. Summarizing, the light-enhancement ratio (R) can be observed with the instant phenomenon when the preselected A.C. and D.C. potentials are applied simultaneously across the cell electrodes and if they are applied across the cell electrodes other than simultaneously, the application of the preselected A.C. potential across the cell electrodes should follow the removal of the preselected D.C. potential therefrom. Also, the so-called "time constant" for the response of the phosphor can be varied where the D.C. potential is varied, by preselecting the relative magnitudes of the A.C. and D.C. potentials which are applied across the cell electrodes.

The phenomenon of A.C.-D.C. electroluminescence is useful in supplying a source of light and in addition, the phenomenon has many other uses. As an example, in the case of powdered phosphors the cells can be operated as a detector of very low A.C. potentials. In Fig. 18 are illustrated the performance characteristics for a cell such as was used in taking the data shown in the curves included in Figs. 5–7, except that the D.C. voltage applied across the cell electrodes was maintained at 65 volts. The light signal in arbitrary units which is plotted on the ordinate values represents the modulated component of the light emission under the simultaneous application of A.C. and D.C., with the A.C. values being plotted on the abscisssa. The light signal threshold as plotted on the ordinate values in Fig. 18 was observed at an A.C. potential of 7 millivolts. Since the normal threshold for A.C. electroluminescence per se occurs in the order of about two volts, the instant method of operating an electroluminescent cell can be utilized to detect very low values of A.C. potential. These very low values of A.C. potential can be measured by any standard optical pick-up means and calibrated in terms of voltage or the device can be used as a visual indicator of very low A.C. potential values. In addition, the resulting light emission can be utilized to provide an electroluminescent light source which is modulated with an A.C. signal. In explanation, in the present A.C.-D.C. electroluminescence, only one flash of enhanced light will be emitted for each complete cycle of the applied A.C. potential, with the result that the modulation is accurately reproduced. Also, where the D.C. potential is maintained constant, the instant method of operating an electroluminescent device produces pulses of enhanced light which have a decay time of less than two microseconds, so that electroluminescent cells when so operated can actually detect radio-frequency signals. The exact decay time for the A.C.-electroluminescent light flashes produced by the A.C.-D.C. electroluminescence has not been determined as the high-frequency source utilized was limited to 500 kilocycles. In operating an electroluminescent cell as a detector for very low A.C. values, the applied D.C. which is utilized should be of sufficient magnitude to generate between the cell electrodes an electric field having an intensity of at least about two volts per micron, as described hereinbefore, although preferably, the applied D.C. voltage is somewhat higher. The A.C. voltage which is applied across the cell electrodes should have an R.M.S. value of at least about 0.0002 of the applied D.C. potential. When the A.C. potential has a value of 0.03 of the applied D.C. potential, the A.C. potential approaches such values that it can be detected by an electroluminescent cell operated in accordance with the usual A.C. electroluminescence per se. In addition, the low A.C. potential detector can be operated by applying the A.C. and D.C. potentials across the cell electrodes other than simultaneously, as indicated hereinbefore. In such case, the application of the A.C. potential across the cell electrodes should follow the removal of the preselected D.C. potential therefrom.

Summarizing the curves shown in Figs. 5 through 18, where powdered phosphors are utilized and the more-sensitive light-enhancement effects of the instant phenomenon are desired, the desired ratio or quotient of Lac/Ldc is from about 0.0001 to about 100 and preferably this ratio of Lac/Ldc is from about 0.01 to about 5. In some cases where light-enhancement effects are utilized, it is desirable to use preselected A.C. potentials having R.M.S. values of from 0.03 to about 0.5 of the value of the preselected D.C. potential. If the electroluminescent cell is to be utilized as a detector of very low A.C. potential values, the R.M.S. A.C. potential which is applied across the cell electrodes should be from about 0.0002 up to 0.03 of the applied D.C. potential. Under some special conditions, even the foregoing A.C. potential value of about 0.5 of the D.C. potential can be exceeded. Thus in the case of powdered phosphors, the preselected A.C. potential which is applied across the cell electrodes should have a value of from about 0.0002 of the preselected D.C. potential up to a value just under that required to cause electrical breakdown between the cell electrodes. In the case of thin-film phosphors, for operating the cells to have sensitive light-enhancement ratios (R), the preselected A.C. potential should have such magnitude with respect to the preselected D.C. potential as applied across the cell electrodes that the ratio of Lac/Ldc desirably is from about 0.001 to about 20 and preferably is from about 0.05 to about 5. In order for the cells utilizing the thin-film phosphors to have a usable light-enhancement ratio (R), the value of the R.M.S. A.C. volts should be from about 0.1 to about 1.5 of the applied D.C. volts. In the case of special cell constructions which have higher electrical-breakdown characteristics, the applied A.C. volts applied across the thin phosphor films should be from about 0.1 of the applied D.C. volts to a value just under that required to cause electrical breakdown between the cell electrodes. In the case of either thin-film phosphors or powdered phosphors, the D.C. potential applied across the cell electrodes should be of such magnitude as to generate an electrical field therebetween of at least about two volts per micron.

In U.S. Patent No. 2,768,310, dated October 23, 1956, is shown and described an electroluminescent imaging device. Briefly this device utilizes grid-mesh type electrodes generally similar to the electrode structure illustrated in Fig. 4 herein, with a layer over the electrodes and phosphor which comprises photoconductor substance. An element 70 of such a device is shown in Fig. 19 and generally comprises a foundation 71 such as light-transmitting glass, having spaced grid-mesh type electrodes 72 placed thereon. As an example these electrodes are formed of tin oxide. Over the electrodes 72 is a layer 74 of powdered phosphor, which as an alternative can have the form of a thin, continuous phosphor film as specified hereinbefore. As an example, in the case of powdered phosphor material, the thickness of the phosphor layer is 10 microns and the phosphor is similar to that which was utilized in taking the performance curves as shown in Figs. 5–7. The circuitry as used to power the device may have various forms, but as an example is generally similar to that as illustrated in the foregoing Fig. 3. If desired, a small amount of dielectric material can be admixed with the powdered phosphor, such as described hereinbefore. Over the phosphor layer 74 is placed an additional layer 76 comprising suitable photoconductor substance. As an example, the photoconductor layer 76 is powdered cadmium sulfide which if desired can have admixed therewith a small amount such as 5% by weight of dielectric material, as in the case of the powdered electroluminescent phosphor. In such an elemental section of an image amplifier device, the electrode spacing and electrode size is determined by the degree of resolution desired for the device and as an example, each elemental electrode 72 has a width of 4 microns with a spacing therebetween of 20 microns. In the operation of the elemental device as illustrated in Fig. 19, the illustrated elemental portion of photoconductor layer 76 is adapted to receive thereon an elemental portion of the radiations comprising the image which is to be amplified. Upon receipt of such an elemental image portion, the photoconductor layer 76 will decrease in resistance and total impedance and will conduct D.C. in accordance with the intensity of the elemental image portion which is received thereon. Reference to Fig. 5 will show that when the electroluminescent cell portions are not conducting D.C. current, or at most only the dark current of the photoconductor ("R"=1,), the resulting light output will be very small. When the photoconductor is irradiated, however, it will conduct D.C. in accordance with the intensity of the image which is irradiated thereon and the simultaneous application of preselected A.C. and D.C. potentials across the cell electrodes 72 will cause the elemental section 70 of the image amplifier to emit light which will vary in intensity in accordance with the intensity of the elemental image portion which is irradiated onto the photoconductor substance 76. The A.C. potential which is applied across the cell electrodes 72 is of sufficient magnitude that when individually applied from one electrode through the layers 74 and 76 and back to the other electrode, with the photoconductor displaying decreased impedance, the phosphor will emit continuing light. Likewise, the D.C. potential as applied across the electrodes 72 is such that when the photoconductor substance displays decreased resistance, the electroluminescent phosphor will emit continuing light. The selected A.C. and D.C. potentials which are applied across the cell electrodes can vary considerably, but desirably are such that when the photoconductor substance displays decreased resistance and total impedance, the ratio of the emitted light intensity under the preselected A.C. potential excitation divided by the emitted light intensity under the preselected D.C. potential excitation is from about 0.0001 to about 100 and preferably is from about 0.01 to about 5. As an example, a D.C. potential of 75 volts and an A.C. potential of 14 volts R.M.S. are applied across the electrodes 72. In the case the electroluminescent phosphor is in thin-film form, such as described for the cells used in taking the curves shown in Figs. 15–17, the selected A.C. and D.C. potentials desirably have such magnitudes that when individually applied across the elemental electrode portions with the photoconductor substance displaying decreased resistance and total impedance, the ratio of the emitted light intensity under the individually-applied A.C. potential excitation divided by the emitted light intensity under the individually-applied D.C. potential excitation is from about 0.001 to about 20 and preferably is from about 0.05 to about 5. Even the foregoing values of preselected A.C. and D.C. potentials as expressed in terms of generated light can be exceeded in some cases, only being limited by the electrical-breakdown characteristics for the device as explained hereinbefore. Also, the A.C. and D.C. potentials can be applied across the electrodes other than simultaneously and in such a case, the application of the preselected A.C. potential across the elemental electrode portions follows the removal of the preselected D.C. potential therefrom. The applied D.C. and R.M.S. A.C. potentials which can be utilized are readily determined from Figs. 5–17.

The image which is applied to the photoconductor layer 76 and which is amplified can be continuous in nature or it can be chopped with a frequency such that the eye will blend the amplified response together to produce a continuing image and as an example, a chopping rate of 40 c.p.s. is suitable. In the case of a chopped image, the frequency of the A.C. potential which is applied across the electrodes of the imaging device should be quite high as compared to the chopping rate and as an example, a frequency of 1000 c.p.s. is suitable. An image amplifier comprising a plurality of elemental sections 70 such as described hereinbefore will be extremely sensitive because of the steep nature of the curves of "R versus applied A.C. potential" such as illustrated in Figs. 5 through 7 for example. The sensitivity can be preselected by modifying the phosphor so that the maximum value of "R" can be obtained or by preselecting the applied D.C. potential to obtain varying slopes for the curves of "R versus A.C. voltage," as shown in the foregoing Figs. 5 through 17. Also, the device can be made to operate on any desired portions of the curves such as shown in Figs. 5 through 17. In addition, by preselecting the applied A.C. and D.C. potentials, the so-called time constant or decay time for light emission from the electroluminescent phosphor can be preselected in order that the effect of the image storage can be introduced or eliminated as desired.

If an increased degree of resolution is desired, the spacing between the electrodes can be decreased considerably in order to decrease the area of the elemental section of the image amplifier device and two elemental portions of such an embodiment 70a are shown in enlarged form in Fig. 20. In such a case, it is desirable to place additional portions of insulator material 78 between each of the elemental electrodes 72a and the phosphor material 74a coated over the elemental electrodes 72a. Also, if the electrical characteristics of the photoconductor substance are materially affected by light emission from the electroluminescent phosphor, a light-shielding layer 80 can be included between the electroluminescent phosphor 74a and the photoconductor layer 76a. Such a light-shielding layer 80 is selected to conduct direct current in a direction generally transverse to the photoconductor layer 76a and electroluminescent phosphor 74a and to have a sufficiently high electrical resistance in a direction generally parallel to the phosphor and the photoconductor substance in order to limit formation of unipotential increments to an area not substantially greater than defined by each of the elemental electrode portions 72a. This is readily achieved by vacuum-metallizing squares 71 of aluminum for example, over each of the electroluminescent phosphor portions 74a and placing between these vacuum-metallized squares 81 an opaque insulating material 82. An example of such an opaque insulator is opaque polyester resin. In both of the embodiments as shown in Figs. 19 and 20, the photoconductor substance and phosphor material are essentially connected in series between each of the elemental electrode portions which comprise the elemental sections 70 and 70a of the image amplifier devices. When the photoconductor substance is irradiated to display decreased resistance and total impedance, a current flows from electrode to electrode. While specific examples of photoconductor substances and light-shielding means have been given, further specific examples of suitable alternative embodiments will be treated in detail hereinafter, including photoconductor substances which have short decay time.

In the case the electrical characteristics of the photoconductor substance are materially affected by light emission from the electroluminescent phosphor and the photoconductor has a fast decay, optical feedback can be prevented by alternately applying or pulsing either or both of the applied preselected A.C. and D.C. potentials and allowing the device to become quiescent between each emission-exciting potential pulse. With such an arrangement, the additional light-shielding means as described hereinbefore can be eliminated. As an example, a pulsing rate of 25 to 40 c.p.s. for either or both of the applied potentials is suitable and where the applied D.C. potential is pulsed, the phosphor should be operated in the "negative slope" portions of the curves shown in Figs. 5 through 17 so that the phosphor decay time is short. The frequency of the A.C.-exciting potential should be high as compared to the pulsing rate and as an example a frequency of 1000 c.p.s. is suitable.

In Fig. 21 is shown a light amplifier which somewhat corresponds to the amplifying device as described in U.S. Patent No. 2,650,310, dated August 25, 1953. The device 84 generally comprises a glass foundation 86 having coated thereover a light-transmitting, electrically conducting electrode layer 88 such as tin oxide. Coated over this electrode layer 88 is a layer 90 comprising any electroluminescent phosphor, which phosphor as an example is identical with any of the phosphors incorporated in the cells utilized in preparing the curves shown in Figs. 5 through 17. If the phosphor is in powdered form, it desirably has admixed therewith a small amount of dielectric material such as 5% by weight and a thickness of 10 microns, for example, is suitable for the layer 90. Coated over the phosphor-dielectric layer 90 is a layer 92 of photoconductor substance which may have admixed therewith a small amount of dielectric material such as 5% by weight for example. Coated over the photoconductor layer 92 is a second electrode layer 94 which is transmissive to the radiations comprising the image which is to be amplified. This second electrode layer 94 can comprise copper iodide or it can have the form of an additional glass foundation which carries a light-transmitting coating of tin oxide thereover, such as described hereinbefore. The energizing circuit for the image amplifier can have various forms and in the embodiment as shown is similar to the circuit as shown in Fig. 1.

Various photoconductor substances can comprise the layer 92, depending upon the performance characteristics which are desired. As an example, powdered cadmium sulfide varies in resistance and total impedance under irradiation by longer wavelength visible radiations or X-rays. Cadmium selenide and cadmium telluride are also similar in response to cadmium sulfide. Powdered zinc-cadmium sulfide is not as sensitive a photoconductor as cadmium sulfide per se, but can be made broadly responsive to different wave lengths by varying the zinc to cadmium ratios, as is well known, and such a photoconductor can respond to a broad range extending from 3650 A.U. to 7000 A.U., as well as to X-rays. Even in the case of comparatively-thin photoconductor layers, the decay times for the powdered inorganic photoconductors as specified are relatively slow under low-intensity irradiation such as is normally used in conjunction with an image-amplifying device and the decay times of the aforementioned inorganic photoconductor substances normally are still in the order of seconds. The foregoing inorganic photoconductor substances can also be evaporated as thin, continuous films by means of the technique as specified hereinbefore for preparing thin films of zinc sulfide electroluminescent phosphor. These films of inorganic photoconductor substance are quite sensitive and are somewhat faster in decay time than the powdered materials. It is also possible to use organic photoconductor substances. Organic photoconductor substances are normally quite fast in response and decay, but are somewhat less sensitive than the powdered substances, although in the instant device, this is not particularly detrimental since the layer 92 comprising the photoconductor substance can be made extremely thin to enhance the effective photoconductor sensitivity. As an example, anthracene photoconductor substance is responsive to ultraviolet to decrease in resistance and under relatively low intensity irradiation has a decay time in the order of 0.01 second. Napthacene is responsive to ultraviolet and to visible radiations up to the yellow portion of the spectrum, which radiations cause this photoconductor to decrease in resistance. Its decay time under low-intensity excitation is slightly slower than the anthracene, however, and is in the order of 0.05 second. Pentacene is responsive to all visible radiations to vary in resistance and is relatively fast in decay time, being somewhat similar to napthacene. In the case organic photoconductors are utilized, it is necessary that the positive pole of the applied D.C. potential is connected to the electrode layer adjacent to the photoconductor surface which is adapted to be irradiated by the image to be amplified. In the case of inorganic photoconductor substances, it does not matter which pole of the applied D.C. potential is connected to the electrode layer adjacent to the photoconductor surface adapted to be irradiated.

All of the inorganic photoconductor substances as given hereinbefore decrease in resistance as well as reactance when exposed to radiations to which they are sensitive. The organic photoconductor substances, however, vary substantially only with respect to resistance when exposed to radiations to which they are sensitive. Of course, a decrease in resistance will result in some decrease in total impedance. It is also possible to sensitize photoconductivity in various photoconductor materials in order to alter the types of radiations to which the photoconductors are responsive. This is accomplished by admixing other materials with the photoconductor substance and such a technique is disclosed in R. C. Nelson article appearing in "Journal of the Optical Society of America," volume 46, No. 1, pages 13–16 (January 1956).

In the image-amplifying devices such as described in the aforenoted U.S. Patent 2,651,310, a change in photoconductor impedance causes the electroluminescent phosphor material to emit light. The image amplifier device 84 as shown in Fig. 21 can be operated in a similar manner, but it is also possible to make the photoconductor layer relatively thin. In such a device the resistance of the photoconductor layer will vary under irradiation by the signal image and the D.C. potential applied across the layer comprising the electroluminescent phosphor will vary to change the resulting light-enhancement ratio (R) as shown in Figs. 5 through 17. Also the resistance of the photoconductor substance can be preselected, such as by the technique as outlined in U.S. Patent No. 2,742,438, date April 17, 1956. Particularly where organic photoconductor substances are used, the photoconductor layer can be made quite thin as compared to the electroluminescent phosphor layer. This is because of the very high resistance normally inherent in such organic photoconductor substances.

As a specific example, the layer 92 comprising photoconductor substance is formed of powdered cadmium sulfide with a thickness of 5 microns. To complete this example, in the case of a 10 micron thick layer of the phosphor as was used in taking the curves shown in Figs. 8–10, the D.C. potential applied across the electrodes is fifty volts and the simultaneously-applied A.C. potential is five volts. A decrease in the resistance of the photoconductor layer will act to valve the applied D.C. potential. For the specific green-emitting zinc sulfide phosphor activated by copper and coactivated by chlorine, the phosphor-response curve will have the general appearance of the curve as illustrated in Fig. 10. The image-amplifier device 84 is quite sensitive and the relatively thin layer of photoconductor material improves the resolution of the resulting amplified image.

In Fig. 22 is shown an alternative image-amplifying device 84a wherein the photoconductor layer 92a is formed of a thin layer of organic photoconductor substance such as a three-micron-thick layer of anthracene for example. The phosphor comprising the layer 90a is so selected that it will have some emission in the red region of the visible spectrum, such as the zinc sulfoselenide phosphor, activated by copper and coactivated by chlorine, as was used in taking the curves shown in Fig. 13. In such a case, if the energizing potentials are not chopped in a manner as specified hereinbefore, there will be some tendency for optical feedback from the phosphor 90a to the photoconductor 92a and to eliminate such tendency, an additional layer 96 comprising a light-shielding material is included between the phosphor and the photoconductor layers. Such a light-shielding layer 96 should have a sufficiently-high electrical resistance in a direction generally parallel to the phosphor and photoconductor layers in order to inhibit formation of unipotential increments of sufficient area to impair the resolution desired for the image-amplifying device. This is readily achieved by vacuum metallizing conducting squares or spots 98 of opaque conducting material such as aluminum for example onto the layer 90a comprising the phosphor and the layer 96 is shown in expanded view in Fig. 23. Between the vacuum-metallized squares of conducting material 98 are included small sections of opaque insulating material 100, such as an opaque polyester resin. Other examples of suitable light-shielding layers are a plurality of nickel or tungsten wires, for example, extending laterally through a layer of opaque insulating material.

As a further alternative embodiment, the electroluminescent phosphor and photoconductor substances can be so selected that the photoconductor substance is not responsive to the light emission from the electroluminescent phosphor to vary appreciably with respect to its electrical characteristics. As an example, if the phosphor utilized is the blue-emitting phosphor as was used in taking the curves shown in Figs. 5 through 7 and the photoconductor substance is anthracene, the photoconductor substance will not respond to the light emanated by the electroluminescent phosphor when it is energized. In such a case, at least one of the electrode layers should be made light transmitting in order to pass the reproduced image and it is not necessary to use the light-shielding layer 96 between the electroluminescent and photoconductor layers or to chop the light-exciting potentials.

In the case the phosphor is in thin-film form, any of the thin-film phosphors as specified hereinbefore can be used. Whatever the phosphor, suitable operating characteristics can be determined from curves such as shown in Figs. 5–17. As in the previous embodiments, in the case the phosphor is in powdered form, the A.C. and D.C. potentials desirably have such magnitudes that when individually applied across the cell electrodes with the layer comprising the photoconductor substance displaying decreased resistance and total impedance (as when it is irradiated), the ratio of the emitted light intensity under the preselected A.C. excitation divided by the emitted light intensity under the preselected D.C. excitation desirably is from about 0.0001 to about 100 and preferably is from about 0.01 to about 5. In the case the phosphors are in thin-film form, the preselected A.C. and D.C. potentials desirably have such magnitudes that when individually applied across the electrode layers with the layer comprising the photoconductor substance displaying decreased resistance and total impedance, the ratio of the emitted light intensity under the preselected A.C. excitation divided by the emitted light under the preselected D.C. excitation is from about 0.001 to about 20 and preferably is from about 0.05 to about 5.

As explained hereinbefore, in some cases it may be desirable to operate on portions of the curves of "R versus A.C. volts" where the ratio of Lac/Ldc is greater than about 100 for powdered phosphors and greater than about 20 for thin-film phosphors. As limited by the electrical-breakdown characteristics for the devices, the foregoing ratios of Lac/Ldc can be exceeded provided that when either of the devices 84 or 84a have simultaneously applied thereto the exciting A.C. and D.C. potentials, with the photoconductor substance displaying decreased resistance and total impedance, the resultant light emission is measurably greater than the sum of the resultant light emissions if first an equivalent A.C.-exciting potential and then an equivalent D.C.-exciting potential are individually applied across the electrode layers of these devices.

In the usual case the preselected A.C. and D.C. potentials are simultaneously applied across the cell electrodes. If they are applied other than simultaneously, the application of the preselected A.C. potential across the cell electrodes follows the removal of the preselected D.C. potential therefrom.

In Fig. 24 is shown another image-amplifier device which operates in accordance with the instant A.C.-D.C. electroluminescence. The amplifying device 104 comprises a plurality of separately-energizable elements 106, three of which are shown in diagrammatic form in Fig. 24. The area of each of the elements 106 is preselected in accordance with the degree of resolution desired for the imaging device. Each of the elements 106 comprises spaced electrodes, the lower electrode 108 being formed of tin oxide on a glass foundation 107 and common to all of the elements 106 in the embodiment as shown. Between the spaced electrodes is a layer 110 comprising electroluminescent phosphor. The phosphor can comprise any electroluminescent phosphor and as an example comprises a ten-micron-thick layer of the blue-emitting phosphor as was used in taking the curves shown in Figs. 5-7. Over the phosphor layer 110 are a plurality of upper electrodes 112 formed of silver or copper iodide for example and which cooperate with equivalent elemental portions of electrode 108 to define the area of elements 106. In the embodiment as shown in Fig. 24, each of the applied D.C. and A.C. potentials are adapted to be varied and are preselected in accordance with the performance curves for the specified electroluminescent phosphor as given hereinbefore. Each of the preselected A.C. potentials are adapted to be applied across the electrodes 108 and 112 through suitable transformers 114 and connecting in series with the transformer secondaries are the D.C. potential sources 116. One side of each of the D.C. potential sources 116 is grounded and the D.C. potential sources display a very low impedance to the A.C. potentials developed across each of the secondaries of transformers 114. Thus the sides of each of the secondaries of transformers 114 proximate the D.C. potential sources 116 are essentially maintained at ground potential with respect to the A.C. potentials developed thereacross. As a specific example, the A.C. potentials are adapted to be varied from 8 to 16 volts and the D.C. potentials are adapted to be varied from 25 to 50 volts. The applied A.C. and D.C. potentials are also adapted to be varied in magnitude in accordance with the relative positions of the elements 106 with respect to one another in accordance with the preselected pattern which is to be presented. This may be effected by mechanical switching arrangements if the presented image is to be changed. The electroluminescent phosphor can also be formed as a thin-film, such as in the cells as were utilized in taking the curves shown in Figs. 15-17. In the case the electroluminescent phosphor is in powdered form, the preselected A.C. and D.C. potentials have such magnitudes that when individually applied across the electrodes of the elements comprising the imaging device, the ratio of the intensity of the A.C. excited light divided by the intensity of the D.C. excited light desirably is from about 0.0001 to about 100 and preferably is from about 0.01 to about 5. In the case the electroluminescent phosphor is in thin-film form, the preselected A.C. and D.C. potentials have such magnitudes that when individually applied across the electrodes of the elements, the ratio of the intensity of the A.C.-excited light divided by the intensity of the D.C.-excited light desirably is from about 0.001 to about 20 and preferably is from about 0.05 to about 5. As explained hereinbefore, in some cases it may be desirable to operate on portions of the curves of "R versus A.C. volts" where the ratio of Lac/Ldc is greater than about 100 for powdered phosphors and greater than about 20 for thin-film phosphors. The foregoing ratios of Lac/Ldc may be exceeded, as limited by the electrical-breakdown characteristics for the device, provided that when the A.C. and D.C. potentials are simultaneously applied to the electrodes 108 and 112, the resultant light emission is measurably greater than the sum of the resultant light emissions if first an equivalent A.C. potential and then an equivalent D.C. potential are individually applied across the electrodes 108 and 112. Also, the portions of the curves of "R versus A.C. volts" on which the phosphor is to be operated can be preselected in accordance with the sensitivity desired for the device and memory characteristics, etc.

In the embodiment as shown in Fig. 24, the A.C. and D.C. potentials are adapted to be applied across the cell electrodes other than simultaneously by the provision of suitable switches 118 and 120 in each of the D.C. and A.C. supply circuits. While normally these potentials will be applied across the electrodes simultaneously, if they are applied across the electrodes other than simultaneously, the application of the A.C. potential across the electrodes of the elements 106 follows the removal of the D.C. potential therefrom. By-pass condensers 121 parallel each of the D.C. supply switches 118.

Normally the imaging device as shown in Fig. 24 will be designed to operate with either the A.C. potential or the D.C. potential maintained at a constant value. Such an embodiment as shown in Fig. 25 wherein the A.C. potential is maintained constant and the D.C. potential is adapted to be varied in accordance with the pattern desired. Suitable condensers 122 connect each of the upper electrodes 112 together and the constant A.C. potential is isolated from the variable D.C. potential sources by suitable inductors 124. Suitable A.C. and D.C. potentials are readily determined from curves such as shown in Figs. 5 through 17. Switches 125 are provided in the A.C. and D.C. supply lines so that the energizing potentials can be applied either simultaneously or individually.

In Fig. 26 is shown a further alternative embodiment for the imaging device shown in Fig. 24 wherein the A.C. potential is adapted to be varied and the D.C. potential is maintained constant. In such an embodiment, the common D.C. potential is supplied to all of the upper electrodes 112 through a common bus 126 and each of the A.C. and D.C. potential supplies are adapted to be applied either simultaneously or separately by the provision of suitable switches 127. A by-pass condenser 128 parallels the constant D.C. potential supply 129.

In Fig. 27 is shown an A.C. or D.C. potential-indicating device 130, which device comprises spaced electrodes 44 and 52 having material therebetween comprising electroluminescent phosphor 48. As an example, the electrodes and phosphor are as described for the cell embodiment shown in Fig. 1 hereinbefore. As in the previous embodiments, an A.C. and a D.C. potential are adapted to be applied across the cell electrodes. One of these potentials is a preselected known potential and the other potential is unknown, although it is variable within known potential extremes. The known potential extremes of the unknown potential and preselected known quantity of potential are so chosen that in the case the phosphor materials are powdered as in the example given, and the preselected known quantity of potential and either of the known potential extremes of the unknown potential are individually applied across the cell electrodes, the ratio of the intensity of the resulting A.C.-excited light divided by the intensity of the resulting D.C.-excited light is desirably from about 0.0001 to about 100 and preferably is from about 0.01 to about 5. As an alternative embodiment, the phosphor is provided in thin-film form and as an example, the electroluminescent portion of the device is as illustrated in Fig. 3. In the case the phosphor is in thin-film form, the preselected known potential which is applied has such value with respect to the known potential extremes of the unknown potential that when the preselected known quantity of potential and either of the known potential extremes of the unknown potential are individually applied across the cell electrodes, the ratio of the intensity of the A.C.-excited light divided by the intensity of the D.C.-excited light desirably is from about 0.001 to about 20 and preferably is from about 0.05 to about 5. Also, as in the embodiments as given hereinbefore, the potentials will normally be applied across the cell electrodes simultaneously, but if they are applied across the cell electrodes other than simultaneously, the application of the A.C. potential across the cell electrodes follows the removal of the D.C. potential therefrom. The A.C. potential is applied through a transformer 131, the secondary of which is in series with the D.C. potential supply and the applied potentials are developed across a dropping resistor 132 which connects to the ground. Suitable switches 133 are provided in the A.C. and D.C. potential supply circuits. The electrode 44 also connects to ground to complete the circuit for the cell.

In the operation of the foregoing A.C. or D.C. potential indicator, either of the A.C. or D.C. potentials is unknown and the other potential is known. As a specific example, the D.C. potential is fixed at 37 volts where the phosphor is the blue-emitting phosphor as was used in taking the data shown in Fig. 6. With this phosphor and cell construction, the known potential extremes of the unknown A.C. potential are desirably 4.5 volts and 16 volts and an unknown A.C. potential falling within these known potential extremes will generate light which varies in intensity in accordance with the magnitude of the unknown potential. As a further specific example, if the phosphor is the green-emitting phosphor as used in taking the curves shown in Fig. 10, the A.C. potential is maintained constant at a value of 5 volts R.M.S., with the unknown D.C. potential desirably occuring between the limits of from 22 volts to 110 volts.

The device as illustrated in Fig. 27 is extremely sensitive in converting relatively small changes in potential to relatively large changes in light emission. Reference to Fig. 6 shows that an A.C. potential variation of from 4.5 to 8 volts with the D.C. potential maintained constant at 37 volts will change the light enhancement ratio (R) of the cell by a factor of more than five for this specific phosphor. The potentials which are manifested in the form of increased light can either be observed visually or can be picked up by a properly calibrated conventional phototube 134, which can have a suitable meter 135 electrically connected therewith so that a direct reading is obtained.

For best sensitivity in the operation of the device as illustrated in Fig. 27, it is desirable that the ratios of Lac/Ldc do not exceed about 100 for powdered phosphors and about 20 for thin-film phosphors. If the A.C. and D.C. potentials are of such values that these ratios are exceeded, the response of the device will be more linear and reasonably large light enhancement ratios can still be obtained, see Fig. 6 for example. The only limitations to operating in the more-linear regions of the curves of "R versus A.C. volts" is the tendency for electrical breakdown across the cell electrodes. Of course for the device to display an enhanced sensitivity, the preselected A.C. and D.C. potentials when simultaneously applied across the cell electrodes should produce a light emission which is measurably greater than the sum of the resultant light emissions if first an equivalent A.C.-exciting potential and then an equivalent D.C.-exciting potential are individually applied across the cell electrodes. In other words, the A.C. and D.C. potentials should be such that the light-enhancement ratios (R) are measurably greater than unity, limited of course by any tendency for electrical breakdown across the cell electrodes.

In Fig. 28 is illustrated an A.C. or D.C. amplifier or electrical-decoupling device 136, which device utilizes the principles of the instant A.C.-D.C. electroluminescence. The device 136 comprises two parts, a light-generating unit 137 and a light-receiving unit 138. In the embodiment as illustrated, the light-generating unit 137 comprises an electroluminescent cell 40 which as an example is identical with the cell construction as disclosed in Fig. 1. The energizing circuit therefor may take various forms and in the circuit as illustrated, the light-transmitting electrode 44 is grounded as are the low-potential sides of the variable A.C. and variable D.C. inputs. In the power supply embodiment as illustrated, the variable A.C. input 140 is connected through an on-off switch 142 to the primary winding of the transformer 144. A variable D.C. source 146 is connected in series with the secondary of transformer 144 through a switch 148 and the low-potential side of this series circuit is connected to ground through a dropping resistor 149.

The light-receiving unit 138 in the embodiment as shown comprises a photosensitive means which as an example comprises a ten-micron-thick layer 150 of any of the inorganic photoconductor substances as described hereinbefore or a three-micron-thick layer of any of the organic photoconductor substances as described hereinbefore. The photoconductor substance is maintained in position by a foundation 152 such as a glass plate and the photoconductor layer 150 is sandwiched between two electrodes 154 and 156. The first electrode 154 is transmissive to the radiations which are to be received by the photoconductor layer 150 and as an example is formed of tin oxide. The second electrode 156 is formed of vacuum-metallized aluminum as an example. A potential source means such as a battery 158 connects to the electrodes 154 and 156 to deliver a signal current thereto and the photoconductor layer 150 carries a signal current which varies in magnitude with the intensity of the light received thereon. There is also included with the potential source means and photosensitive means a signal-converting means which in the embodiment as illustrated has the form of a dropping resistor 160 and a suitable filter 162, in order that the output signal is direct current. If an A.C. output signal is desired, the filter 162 is removed from the circuit. If desired, the photoconductor arrangement as shown in Fig. 28 could be replaced by a simple phototube arrangement such as is illustrated in Fig. 27.

For best sensitivity of the device as shown in Fig. 28, in the case the phosphor is in powdered form, the A.C. and D.C. potentials which are applied across the electrodes of the cell 40 fall within such potential values than when individually applied across the cell electrodes, the ratio of the intensity of the A.C.-excited light divided by the intensity of the D.C.-excited light desirably is from about 0.0001 to about 100 and preferably is from about 0.01 to about 5. The phosphor can also be in thin-film form such as is illustrated in the cell embodiment shown in Fig. 3 and in such a case, for maximum sensitivity the applied A.C. and D.C. potentials fall within such potential values than when individually applied across the cell electrodes, the ratio of the intensity of the A.C.-excited light divided by the intensity of the D.C.-excited light desirably is from about 0.001 to about 20 and preferably is from about 0.05 to about 5. Also, the A.C. and D.C. potentials can be applied across the cell electrodes other than simultaneously and in such a case, the application of the A.C. potential across the cell electrodes follows the removal of the D.C. potential therefrom.

While the aforementioned values of A.C. and D.C. potentials, as expressed in terms of the ratios of Lac/Ldc are desired for most-sensitive operation for the device as shown in Fig. 28, it may be desirable to operate on portions of the curves of "R versus A.C. volts" where the ratio of Lac/Ldc is greater than about 100 for powdered phosphors and greater than about 20 for thin-film phosphors. This is particularly true wherein a more-linear response is desired. As an example, reference to Fig. 6 shows that a reasonably large light-enhancement ratio (R) is still achieved where the ratio of Lac/Ldc is greater than about 100 and in this region the response will be more linear. Accordingly, as limited by the electrical-breakdown characteristics for the electroluminescent portion of the device, the foregoing ratios of Lac/Ldc can be exceeded provided that when the A.C. and D.C. potentials are simultaneously applied across the cell electrodes, the resultant light emission is measurably greater than the sum of the resultant light emissions if first an equivalent A.C.-exciting potential and then an equivalent D.C.-exciting potential are individually applied across the cell electrodes.

In Fig. 29 is illustrated an alternative embodiment 136a for the A.C. or D.C. amplifier or decoupling device wherein the D.C. potential which is applied across the electroluminescent cell electrodes is maintained constant such as by means of a battery 164. The A.C. potential source 165 is variable and both the A.C. and D.C. potentials are adapted to be applied across the cell electrodes other than simultaneously, if desired, by the provision of switches 166 in the energizing circuits. A bypass condenser 167 parallels the D.C. potential supply 164. In this embodiment, the variable input is A.C. and the output is polarized A.C. If desired the output could be converted to D.C. by the provision of a suitable filter 162 in a manner as is shown in Fig. 28. Other than the indicated differences the light-generating unit 137 and light-receiving unit 138 are identical with those shown in Fig. 28.

In Fig. 30 is shown a further alternative embodiment 136b wherein the A.C. potential source 168 delivers a constant potential and the D.C. potential source 169 delivers a variable potential. Thus this embodiment corresponds to the embodiments shown in Figs. 28 and 29 except that the D.C. input is variable and the device has an A.C. output. By incorporating a filter 162 into the output of the light-receiving unit 138, a D.C. output could be obtained. The foregoing devices as shown in Figs. 28 through 30 are completely electrically decoupled from one another and can be made quite sensitive. In addition, the response characteristics for the devices can be varied by varying the portions of the curves of "R versus A.C. volts" on which the devices are operated.

In Fig. 31 is shown a still-further alternative embodiment 136c for the device as illustrated in Fig. 28. In this embodiment the light-generating unit 137 corresponds to the unit as illustrated in Fig. 29 and is provided with a variable A.C. input and a constant D.C. input. The light-receiving unit is divided into two units, 170 and 171, both of which are identical except that the unit 171 has a filter 162 included in its output circuit. The units 170 and 171 respectively correspond to the light-receiving units shown in Figs. 29 and 28. Thus the device shown in Fig. 31 has a single light-generating unit and plural light-receiving units, the outputs of which are the same except that one is polarized A.C. and the other is D.C. It should be noted that as a still-further alternative embodiment, any of the devices of Figs. 28–31 could be provided with plural light-generating units such as shown in Fig. 33. These would cooperate with either one or more than one light-receiving unit to generate the desired signals.

In Fig. 32 is shown a solid-state relay which comprises a light-generating unit which as an example is identical with the light-generating unit 137 as disclosed in Fig. 28. The light-receiving unit is also similar to the light-receiving unit 138 as disclosed in Fig. 28 except that the output circuit is provided with a relay 172 which serves as a current-detecting means and is responsive to the current carried by the photosensitive means 150 under light excitation from the light-generating unit 137. More than one light-receiving unit could be provided, such as shown in Fig. 31, the outputs of which could actuate more than one relay.

Fig. 33 illustrates an alternative embodiment for the unit as shown in Fig. 32, except that the device is provided with plural light-generating units 173 and 174, one of which is adapted to be energized by variable D.C. and constant A.C. and the other which is adapted to be energized by variable A.C. and constant D.C. As an example, the first of these units 173 is identical with the light-generating unit and power supply therefor as described in Fig. 29 and the second of these units 174 is identical with the light-generating unit and power supply therefor as described in Fig. 30. The light-receiving unit comprises a standard phototube 134 such as is illustrated in Fig. 27 and its output is utilized to energize a current detecting means, which in the embodiment as illustrated takes the form of a relay 172 actuated through a conventional amplifier 177, shown in block diagram.

As indicated under the description of the A.C. or D.C. amplifying or electrical decoupling devices shown in Figs. 28–31, where best sensitivity is desired for the devices as shown in Figs. 32 and 33 and the phosphor is in powdered form, the A.C. and D.C. potentials as applied across the electroluminescent cell electrodes should fall within such values that when individually applied thereacross, the ratio of the intensity of the A.C.-excited light divided by the intensity of the D.C.-excited light desirably is from about 0.0001 to about 100 and preferably from about 0.01 to about 5. In the case the phosphor is in thin-film form, the A.C. and D.C. potentials should be so selected that when individually applied across the electrodes of the electroluminescent device, the ratio of the intensity of the A.C.-excited light divided by the intensity of the D.C.-excited light desirably is from about 0.001 to about 20 and preferably is from about 0.05 to about 5. As in the previous embodiments, if the A.C. and D.C. potentials are applied across the cell electrodes other than simultaneously, the application of the preselected A.C. potential across the cell electrodes follows the removal of the preselected D.C. potentials therefrom. If best sensitivity is not required, the A.C. and D.C. potentials which are applied across the cell electrodes may be such that the ratio of Lac/Ldc is greater than about 100 for powdered phosphors and greater than about 20 for thin-film phosphors. As in the embodiments as described hereinbefore, the foregoing ratios of Lac/Ldc may be exceeded as limited by the electrical breakdown characteristics for the electroluminescent portion of the device, provided that when the light-generating units of the devices have simultaneously applied thereto the A.C. and D.C. potentials, the resultant light emission is measurably greater than the sum of the resultant light emission if first an equivalent A.C.-exciting potential and then an equivalent D.C.-exciting potential are individually applied across the cell electrodes.

In Fig. 34 is shown in diagrammatic form an imaging device which is somewhat similar to the device as disclosed in U.S. Patent No. 2,698,915, dated January 4, 1955. As in this U.S. patent, the device generally comprises a first electrode grid 178 comprising a plurality of substantially parallel and spaced conductors and a second electrode grid 180 comprising a plurality of substantially parallel and spaced conductors separated from the first grid 178, with the axes of the conductors comprising the second grid axially aligned at an angle to the axes of the conductors comprising the first grid. Desirably this axial alignment is approximately 90 degrees although it can be varied. Normally the conductors comprising at least one of the grids 178 and 180 are formed of light-transmitting material such as tin oxide on a glass foundation (not shown). In the case the conductors comprising the grids are formed of opaque fine wires, however, light emission can be obtained from around the fine wires. Between the electrode grids is a material comprising electroluminescent phosphor 182 and any electroluminescent phosphor is suitable. As a specific example, the phosphor as was used in taking the curves shown in Figs. 8–10 is included between the grids in a thickness of 10 microns, with or without the small amount of admixed dielectric. In the embodiment as shown in Fig. 34, only the A.C. potential is adapted to be varied in magnitude and the A.C.- and D.C.-energizing potentials are adapted to be applied across the grids 178 and 180 simultaneously or other than simultaneously. If the A.C. and D.C. potentials are to be applied other than simultaneously, as by the provision of suitable switches 183, A.C. potential should be applied to the grids after the removal of the D.C. potential therefrom. In the operation of the device, the variable A.C. potential sources designated A.C.-1 and A.C.-2 are each applied to individual preselected conductors comprising the grid 178. The constant D.C. potential is applied to each of the conductors comprising the grid 180. When the switching mechanism 184 grounds the preselected conductor comprising the grid 180 through condenser 186, with respect to the variable A.C. potentials, the A.C. and D.C. potential will be applied simultaneously across the phosphor material 182 which is positioned between the grounded conductor of grid 180 and the conductors comprising the grid 178. This will produce a linear series of light flashes, with the intensity of each light flash depending on the relative values of the simultaneously-applied A.C. and D.C. potentials. When the next conductor comprising the grid 180 is grounded, this will produce a second series of light flashes, the composite of which can be so selected as to produce an image. Such a device can be made extremely sensitive because of the sharp nature of the curves as shown herein, see Figs. 5 through 17. The switching mechanism 184 as disclosed can be identical with that disclosed in the aforementioned U.S. Patent No. 2,698,915.

In Fig. 35 is shown an alternative embodiment of the cross-grid imaging device which is similar to the device as shown in Fig. 34 except that the A.C. potential is fixed and only the D.C. potential is adapted to be varied. In Fig. 36 is shown a still-further alternative embodiment of the device as shown in Fig. 34 wherein both the A.C. and D.C. potentials are adapted to be varied. In the operation of the embodiment as shown in Fig. 35, the constant A.C. potential is applied through condensers 188 to all of the conductors comprising the grids 178 and 180 and is isolated from the variable D.C. supplies by suitable inductors 190. When the switching device 184a grounds a preselected conductor comprising the grid 178, the A.C. and D.C. potentials are simultaneously applied between this preselected conductor and the conductors comprising the grid 180 to cause the phosphor material included therebetween to electroluminesce. In the embodiment as shown in Fig. 36, two switching devices 184b and 184c are provided. In the operation of this last embodiment, the phosphor material between the simultaneously-energized crossed conductors comprising the grids 178 and 180 will electroluminesce. A condenser 191 is provided to ground one side of the secondary of input transformer 192. In either of the embodiments as shown in Figs. 35 and 36, if the A.C.- and D.C.-energizing potentials are applied other than simultaneously, as by the provision of suitable switches 194, the A.C. potential should be applied to the grids after the removal of the D.C. potential therefrom.

In any of the embodiments as shown in Figs. 34 through 36, the preselected A.C. and D.C. potentials are adapted to be varied in magnitude in accordance with the relative positions of the conductors comprising the grids 178 and 180 and in accordance with the preselected pattern. For best sensitivity, where the phosphor 182 is in powdered form, the applied A.C. and D.C. potentials should have such values as applied across the grids that when individually applied thereacross, the ratio of the intensity of the A.C.-excited light divided by the intensity of the D.C.-excited light desirably is from about 0.001 to about 100 and preferably is from about 0.01 to about 5. In the case the phosphor is in thin-film form, and any of the thin-film phosphors as described hereinbefore are suitable, the applied A.C. and D.C. potentials desirably have such values as applied across the grids that when individually applied thereacross, the ratio of the intensity of the A.C.-excited light divided by the intensity of the D.C.-excited light desirably is from about 0.001 to about 20 and preferably is from about 0.05 to about 5. As in the case of the various devices as described hereinbefore, it may be desirable to operate on portions of the curves of "R versus A.C. volts" where the ratios of Lac/Ldc are greater than about 100 for powdered phosphors and greater than about 20 for thin-film phosphors. As limited by the electrical breakdown characteristics for the electroluminescent phosphors, the foregoing ratios of Lac/Ldc may be exceeded provided that when the crossed grids have simultaneously applied thereto the exciting A.C. and D.C. potentials, the resultant light emission is measurably greater than the sum of the resultant light emission if first an equivalent A.C.-exciting potential and then an equivalent D.C.-exciting potential are individually applied across the crossed grids. As can be seen from curves such as included in Fig. 6 for example, the sensitivity of such an imaging device can be reasonably good even when the ratios of Lac/Ldc exceed the aforementioned values, since the light-enhancement ratio (R) is still quite large even after the ratio of Lac/Ldc exceeds 100.

Summarizing, in the operation of any of the devices as shown in Figs. 19–36, the selected A.C. and D.C. potentials which are actually applied across the phosphor are such that when these potentials are simultaneously applied thereacross, the resultant light emission is measurably greater than the sum of the resultant light emissions if an equivalent A.C. potential and then an equivalent D.C. potential are individually applied across the phosphor. Where the best light-enhancement effects are desired and the phosphor is in powdered form, the selected A.C. and D.C. potentials are such that the ratio or quotient of Lac/Ldc is from about 0.0001 to about 100 and preferably from about 0.01 to about 5. Also, in order for the devices to have usable light-enhancement ratios, the preselected A.C. potentials should have R.M.S. values of from 0.03 to about 0.5 of the value of the preselected D.C. potential. The cell constructions can be modified so that even the foregoing A.C. potential value of about 0.5 of the D.C. potential can be exceeded. Thus in the case of powdered phosphors where the light-enhancement effects are utilized, the preselected A.C. potential which is actually applied across the phosphor should have a value of from 0.03 of the preselected D.C. potential up to a value just under that required to cause electrical breakdown between the cell electrodes. In the case of thin-film phosphors, for operating the devices to have the best light-enhancement ratios (R), the preselected A.C. potential should have such magnitude with respect to the preselected D.C. potential as actually applied across the phosphor, that the ratio of Lac/Ldc is from about 0.001 to about 20 and preferably is from about 0.05 to about 5. In order for the cells utilizing the thin-film phosphors to have a usable light-enhancement ratio (R), the value of the R.M.S. A.C. potential should be at least about 0.1 of the D.C. potential and desirably should not exceed about 1.5 of the D.C. potential if electrical breakdown is to be avoided. In the case the cells utilizing the thin-film phosphors have special constructions resulting in higher electrical-breakdown characteristics, the applied A.C. volts should be from about 0.1 of the applied D.C. volts to a value just under that required to cause electrical breakdown between the cell electrodes. In the case of either thin-film phosphors or powdered phosphors, the D.C. potential applied across the cell electrodes should be of such magnitude as to generate an electrical field therebetween of at least about two volts per micron. Also in any of the devices as shown in Figs. 19 through 35, the A.C. and D.C. potentials may be applied simultaneously and if applied other than simultaneously, the application of A.C. potential between the cell electrodes should follow the removal of D.C. potential therefrom. In all cases, specific A.C. and D.C. potential values are readily determinable from curves such as shown in Figs. 5 through 17.

It will be recognized that the objects of the invention have been achieved by providing a method for operating an electroluminescent cell with both preselected A.C. and D.C. potential excitation in order to achieve an enhanced light output. In addition there has been provided a method for operating an electroluminescent cell whereby very low values of A.C. potential will energize the cell to light emission. In addition there have been provided very sensitive image amplifiers which if desired can be operated with a very fast response. There have also been provided A.C. or D.C. potential indicators and solid-state A.C. or D.C. amplifying devices or electrical decoupling devices, or both, as well as A.C. or D.C. actuated relays.

As a possible alternative embodiment, the imaging devices as illustrated in Figs. 19 through 23 hereinbefore can be used to present visually an image formed of cathode rays, such as in conjunction with a cathode-ray tube. Photoconductive substances as specified hereinbefore are also responsive to cathode rays to vary in resistance and total impedance. In this respect these materials can be identified as "particle-bombardment conductive." It is to be understood that the term "photoconductive substance" as used herein is intended to include either radiation-induced conductivity or particle-bombardment conductivity, or both.

As a further alternative embodiment, the electrode structures for the embodiments as shown hereinbefore in Figs. 20 through 33 can be varied, such as indicated under the description of the cells as shown in Figs. 1 through 4 hereinbefore.

While numerous embodiments have been illustrated and described in detail, it is to be particularly understood that the invention is not limited thereto or thereby.

I claim:

1. The method of operating an electroluminescent cell having spaced electrodes and material comprising electroluminescent phosphor therebetween and which cell can emit continuing light under individual excitation by D.C. potential and individual excitation by A.C. potential: comprising establishing preselected D.C. potential and preselected A.C. potential, with the magnitudes of said preselected D.C. and A.C. potentials being such that if said preselected D.C. and A.C. potentials are simultaneously applied across said cell electrodes, the resultant light emission is measurably greater than the sum of the resultant light emissions if said preselected A.C. potential and then said preselected D.C. potential are individually applied across said cell electrodes; in the case said phosphor is in powdered form, said preselected A.C. potential having an R.M.S. value falling within the range of from about 0.0002 to about 0.5 of said preselected D.C. potential; in the case said phosphor is in thin-film form, said preselected A.C. potential having an R.M.S. value falling within the range of from about 0.1 to about 1.5 of said preselected D.C. potential; and applying said preselected D.C. and A.C. potentials across said cell electrodes, with application of said preselected D.C. potential occurring before application of said preselected A.C. potential is discontinued.

2. The method of operating an electroluminescent cell having spaced electrodes and material comprising electroluminescent phosphor therebetween and which cell can emit continuing light under individual excitation by D.C. potential and individual excitation by A.C. potential: comprising establishing preselected D.C. potential and preselected A.C. potential, with the magnitudes of said preselected D.C. and A.C. potentials being such that if said preselected D.C. and A.C. potentials are simultaneously applied across said cell electrodes, the resultant light emission is measurably greater than the sum of the resultant light emissions if said preselected A.C. potential and then said preselected D.C. potential are individually applied across said cell electrodes; in the case said phosphor is in powdered form, said preselected A.C. potential having an R.M.S. value falling within the range of from about 0.0002 to about 0.5 of said preselected D.C. potential; in the case said phosphor is in thin-film form, said preselected A.C. potential having an R.M.S. value falling within the range of from about 0.1 to about 1.5 of said preselected D.C. potential; and simultaneously applying said preselected D.C. and A.C. potentials across said cell electrodes.

3. The method of operating an electroluminescent cell having spaced electrodes and material comprising electroluminescent phosphor therebetween and which cell can emit continuing light under individual excitation by D.C. potential and individual excitation by A.C. potential: comprising establishing preselected D.C. potential and preselected A.C. potential, with the magnitudes of said preselected D.C. and A.C. potentials being such that if said preselected D.C. and A.C. potentials are simultaneously applied across said cell electrodes, the resultant light emission is measurably greater than the sum of the resultant light emissions if said preselected A.C. potential and then said preselected D.C. potential are individually applied across said cell electrodes; in the case said phosphor is in powdered form, said preselected A.C. potential having an R.M.S. value falling within the range of from about 0.0002 to about 0.5 of said preselected D.C. potential; in the case said phosphor is in thin-film form, said preselected A.C. potential having an R.M.S. value falling within the range of from about 0.1 to about 1.5 of said preselected D.C. potential; and applying said preselected D.C. and A.C. potentials across said cell electrodes with the application of said preselected A.C. potential across said cell electrodes following the removal of said preselected D.C. potential therefrom.

4. The method of operating an electroluminescent cell having spaced electrodes and material comprising powdered electroluminescent phosphor therebetween and which cell can emit continuing light under individual excitation by D.C. potential and individual excitation by A.C. potential: comprising establishing preselected D.C. potential and preselected A.C. potential, with the magnitudes of said preselected D.C. and A.C. potentials being such that if said preselected D.C. and A.C. potentials are simultaneously applied across said cell electrodes, the resultant light emission is measurably greater than the sum of the resultant light emissions if said preselected A.C. potential and then said preselected D.C. potential are individually applied across said cell electrodes; said preselected A.C. potential having an R.M.S. value falling within the range of from 0.03 to about 0.5 of said preselected D.C. potential; and applying said preselected D.C. and A.C. potentials across said cell electrodes, with application of said preselected D.C. potential occurring before application of said preselected A.C. potential is discontinued.

5. The method of operating an electroluminescent cell having spaced electrodes and material therebetween comprising electroluminescent phosphor and which cell emits continuing light under individual A.C. potential excitation and individual D.C. potential excitation: comprising preselecting D.C. and R.M.S. A.C. potentials in accordance with the relative intensities of the resulting light emissions when such preselected A.C. and D.C. potentials are individually applied across said electrodes; in the case said electroluminescent phosphor is in powdered form and said preselected potentials are individually applied across said electrodes, the ratio of the intensity of the A.C.-excited light divided by the intensity of the D.C.-excited light is from about 0.0001 to about 100; in the case said electroluminescent phosphor is in thin-film form and said preselected potentials are individually applied across said electrodes, the ratio of the intensity of the A.C.-excited light divided by the intensity of the D.C.-excited light is from about 0.001 to about 20; and applying said preselected potentials across said electrodes, with application of said preselected D.C. potential occurring before application of said preselected A.C. potential is discontinued.

6. The method of operating an electroluminescent cell having spaced electrodes and material therebetween comprising electroluminescent phosphor and which cell emits continuing light under individual A.C. potential excitation and individual D.C. potential excitation: comprising preselecting D.C. and R.M.S. A.C. potentials in accordance with the relative intensities of the resulting light emissions when such preselected A.C. and D.C. potentials are individually applied across said electrodes; in the case said electroluminescent phosphor is in powdered form and said preselected potentials are individually applied across said electrodes, the ratio of the intensity of the D.C'-excited light is from about 0.01 to about 5; in the case said electroluminescent phosphor is in thin-film form and said preselected potentials are individually applied across said electrodes, the ratio of the intensity of the A.C.-excited light divided by the intensity of the D.C.-excited light is from about 0.05 to about 5; and applying said preselected potentials across said electrodes, with application of said preselected D.C. potential occurring before application of said preselected A.C. potential is discontinued.

7. The process of operating an electroluminescent cell having spaced electrodes and material therebetween comprising powdered electroluminescent phosphor and which cell emits continuing light under individual excitation by D.C. potential and individual excitation by A.C. potential, comprising applying across said cell electrodes a preselected D.C. potential of sufficient magnitude to generate therebetween an electric field having an intensity of at least about two volts per micron, and applying across said cell electrodes an A.C. potential having an R.M.S. value of from about 0.0002 up to 0.03 of the applied D.C. potential with the application of said preselected D.C. potential occurring before the application of said preselected A.C. potential is discontinued.

8. An imaging device comprising a plurality of elemental sections having an area defined by the degree of resolution desired for said device and comprising: spaced elemental electrode portions; a material layer comprising electroluminescent phosphor and a material layer comprising photoconductor substance proximate one another and connecting in series between said elemental electrode portions; said photoconductor substance adapted to receive thereon an elemental portion of the image to be amplified and to decrease in resistance and total impedance in accordance with the intensity of the image elemental portion received thereon; an A.C. potential supply means connecting to said elemental electrode portions; a D.C. potential supply means connecting to said elemental electrode portions; individual application of A.C. potential across said elemental electrode portions with said photoconductor substance displaying decreased total impedance causing said electroluminescent phosphor to emit continuing light; individual application of D.C. potential across said elemental electrode portions with said photoconductive substance displaying decreased resistance causing said electroluminescent phosphor to emit continuing light; preselected A.C. and D.C. potentials adapted to be applied to said elemental electrode portions; said preselected A.C. and D.C. potentials each having such magnitudes that when simultaneously applied across said elemental electrode portions with said photoconductor substance displaying decreased resistance and total impedance, the resultant light emission is measurably greater than the sum of the resultant light emissions if said preselected A.C. potential and then said preselected D.C. potential are individually applied across said elemental-electrode portions; and means for timing the application of said preselected D.C. and A.C. potentials across said elemental-electrode portions so that application of said preselected D.C. potential occurs before application of said preselected A.C. potential is discontinued.

9. An imaging device comprising a plurality of elemental sections, each of said elemental sections having an area defined by the degree of resolution desired for said device and comprising: spaced elemental electrode portions; material comprising electroluminescent phosphor and material comprising photoconductor substance connecting in series between said elemental electrode portions; said photoconductor substance adapted to receive thereon an elemental portion of the image to be amplified and to decrease in resistance and total impedance in accordance with the intensity of the image elemental portion received thereon; an A.C. potential supply connecting to said elemental electrode portions; a D.C. potential supply connecting to said elemental electrode portions; individual application of A.C. potential across said elemental electrode portions with said photoconductor substance displaying decreased total impedance causing said electroluminescent phosphor to emit continuing light; individual application of D.C. potential across said elemental electrode portions with said photoconductive substance displaying decreased resistance causing said electroluminescent phosphor to emit continuing light; preselected A.C. and D.C. potentials adapted to be applied to said elemental electrode portions; in the case said electroluminescent phosphor is in powdered form, said preselected A.C. and D.C. potentials each having such magnitudes that when individually applied across said elemental electrode portions with said photoconductor substance displaying decreased resistance and total impedance, the ratio of the emitted light intensity under said preselected A.C. potential excitation divided by the emitted light intensity under said preselected D.C. potential excitation is from about 0.0001 to about 100; in the case said electroluminescent phosphor is in thin-film form, said preselected A.C. and D.C. potentials each having such magnitudes that when individually applied across said elemental electrode portions with said photoconductor substance displaying decreased resistance and total impedance, the ratio of the emitted light intensity under said preselected A.C. potential excitation divided by the emitted light intensity under said preselected D.C. potential excitation is from about 0.001 to about 20; means for timing the application of said preselected A.C. and D.C. potentials across said electrode elemental portions so that application of said preselected D.C. potential occurs before application of said preselected A.C.

potential is discontinued; and in the case the electrical characteristics of said photoconductor substance are materially affected by light emission from said electroluminescent phosphor, a light-shielding means sandwiched between said phosphor and said photoconductor substance, and said light-shielding means having a sufficiently high electrical resistance in a direction generally parallel to said phosphor and said photoconductor substance to limit formation of unipotential increments to an area not substantially greater than defined by each of said elemental electrode portions.

10. An image-amplifying device comprising: a first electrode layer; a second electrode layer spaced from said first electrode layer; at least one of said electrode layers being light transmissive; a layer comprising electroluminescent phosphor included between said electrode layers and proximate said second electrode layer; a layer comprising photoconductor substance included between said electrode layers and proximate said first electrode layer; said first electrode layer adapted to receive thereon and transmissive to the image to be amplified; said layer comprising photoconductor substance acting to decrease in resistance and total impedance in accordance with the intensity of the image to be received on said first electrode layer; an A.C. potential supply connecting to said electrode layer; a D.C. potential connecting to said electrode layers; individual application of A.C. potential across said electrode layers with said layer comprising photoconductor substance displaying decreased impedance causing said layer comprising electroluminescent phosphor to emit continuing light varying in intensity with the magnitude of the applied A.C. potential; individual application of D.C. potential across said electrode layers with said layer comprising photoconductor substance displaying decreased resistance causing said layer comprising electroluminescent phosphor to emit continuing light varying in intensity with the magnitude of the applied D.C. potential; preselected A.C. and D.C. potentials adapted to be applied to said electrode layers; said preselected A.C. and D.C. potentials having such magnitudes that when simultaneously applied across said electrode layers with said layer comprising photoconductor substance displaying decreased resistance and total impedance, the resultant light emission is measurably greater than the sum of the light emissions if said preselected A.C. potential and then said preselected D.C. potential are individually applied across said electrode layers; and means for timing the application of said preselected D.C. and A.C. potentials across said electrode layers so that application of said preselected D.C. potential occurs before application of said preselected A.C. potential is discontinued.

11. An image-amplifying device comprising: a first electrode layer; a second electrode layer spaced from said first electrode layer; a layer comprising electroluminescent phosphor included between said electrode layers and proximate said second electrode layer; a layer comprising photoconductor substance included between said electrode layers and proximate said first electrode layer; said first electrode layer adapted to receive thereon and transmissive to the image to be amplified; said layer comprising photoconductor substance acting to decrease in resistance and total impedance in accordance with the intensity of the image to be received on said first electrode layer; an A.C. potential supply connecting to said electrode layers; individual application of A.C. potential across said electrode layers with said layer comprising photoconductor substance displaying decreased impedance causing said layer comprising electroluminescent phosphor to emit continuing light varying in intensity with the magnitude of the applied A.C. potential; individual application of D.C. potential across said electrode layers with said layer comprising photoconductor substance displaying decreased resistance causing said layer comprising electroluminescent phosphor to emit continuing light varying in intensity with the magnitude of the applied D.C. potential; preselected A.C. and D.C. potentials adapted to be applied to said electrode layers; in the case said phosphor is in powdered form, said preselected A.C. and D.C. potentials having such magnitudes that when individually applied across said electrode layers with said layer comprising photoconductor substance displaying decreased resistance and total impedance, the ratio of the emitted light intensity under said preselected A.C. excitation divided by the emitted light intensity under said preselected D.C. excitation is from about 0.0001 to about 100; in the case said phosphor is in thin-film form, said preselected A.C. and D.C. potentials having such magnitudes than when individually applied across said electrode layers with said layer comprising photoconductor substance displaying decreased resistance and total impedance, the ratio of the emitted light intensity under said preselected A.C. excitation divided by the emitted light intensity under said preselected D.C. excitation is from about 0.001 to about 20; means for timing the application of said preselected D.C. and A.C. potentials across said electrode layers so that application of said preselected D.C. potential occurs before application of said preselected A.C. potential is discontinued; in the case the electrical characteristics of said photoconductor substance are materially unaffected by and transmissive to light emission from said layer comprising electroluminescent phosphor, at least one of said electrode layers being light transmissive; and in the case the electrical characteristics of said photoconductor substance are materially affected by light emission from said electroluminescent phosphor, said second electrode layer being light transmissive and a light-shielding means included between said phosphor and said photoconductor substance, and said light-shielding means having a sufficiently high electrical resistance in a direction generally parallel to said layer comprising phosphor and said layer comprising photoconductor substance to inhibit formation of unipotential increments of sufficient area to impair the resolution desired for said device.

12. An image amplifying device comprising: a first electrode layer; a light-transmissive second electrode layer spaced from said first electrode layer; a layer comprising electroluminescent phosphor included between said electrode layers and proximate said second electrode layer; a layer comprising photoconductor substance included between said electrode layers and proximate said first electrode layer; said layer comprising photoconductor substance having a thickness less than said layer comprising electroluminescent phosphor; said first electrode layer adapted to receive thereon and transmissive to the image to be amplified; said layer comprising photoconductor substance acting to decrease in resistance and total impedance in accordance with the intensity of the image to be received on said first electrode layer; an A.C. potential supply connecting to said electrode layers; a D.C. potential connecting to said electrode layers; individual application of A.C. potential across said electrode layers with said layer comprising photoconductor substance displaying decreased impedance causing said layer comprising electroluminescent phosphor to emit continuing light varying in intensity with the magnitude of the applied A.C. potential; individual application of D.C. potential across said electrode layers with said layer comprising photoconductor substance displaying decreased resistance causing said layer comprising electroluminescent phosphor to emit continuing light varying in intensity with the magnitude of the applied D.C. potential; preselected A.C. and D.C. potentials adapted to be applied to said electrode layers; in the case said phosphor is in powdered form, said preselected A.C. and D.C. potentials having such magnitudes that when individually applied across said electrode layers with said layer comprising photoconductor substance displaying decreased resistance and total impedance, the ratio of the emitted light intensity under said preselected A.C. excitation divided by the emitted light intensity under said preselected D.C. excitation is from about 0.01 to about 5; in the case said phosphor is in thin-film form, said preselected A.C. and D.C. potentials having such magnitudes that when individually applied across said electrode layers with said layer comprising photoconductor substance displaying decreased resistance and total impedance, the ratio of the emitted light intensity under said preselected A.C. excitation divided by the emitted light intensity under said preselected D.C. excitation is from about 0.05 to about 5; and means for timing the application of said preselected D.C. and A.C. potentials across said electrode layers so that application of said preselected D.C. potential occurs before application of said preselected A.C. potential is discontinued.

13. A display device comprising: a plurality of separately-energizable elements each having an area preselected in accordance with the degree of resolution desired for said device, each of said elements comprising spaced electrodes at least one of which is light transmitting and material comprising finely-divided electroluminescent phosphor therebetween; individual application of A.C. potential across the electrodes of said elements exciting phosphor material therebetween to continuing light emission; individual application of D.C. potential across the electrodes of said elements exciting phosphor material therebetween to continuing light emission; A.C. and D.C. potentials of preselected magnitudes adapted to be applied across the electrodes of said elements; at least one of said preselected A.C. and D.C. potentials adapted to be varied in magnitude in accordance with the relative positions of said elements with respect to one another and in accordance with a preselected pattern; said preselected A.C. potential having an R.M.S. value falling within the range of from about 0.03 to about 0.5 of said preselected D.C. potential; and means for timing the application of said preselected A.C. and D.C. potentials across the electrodes of said elements so that application of said preselected D.C. potential occurs before application of said preselected A.C. potential is discontinued.

14. A display device comprising: a plurality of separately-energizable elements each having an area preselected in accordance with the degree of resolution desired for said device; each of said elements comprising spaced electrodes at least one of which is light transmitting and material comprising electroluminescent phosphor therebetween; individual application of A.C. potential across the electrodes of said elements exciting phosphor material therebetween to continuing light emission; individual application of D.C. potential across the electrodes of said elements exciting phosphor material therebetween to continuing light emission; A.C. and D.C. potentials of preselected magnitudes adapted to be applied across the electrodes of said elements; at least one of said preselected A.C. and D.C. potentials adapted to be varied in magnitude in accordance with the relative positions of said elements with respect to one another and in accordance with a preselected pattern; in the case said electroluminescent phosphor is in powdered form, said preselected A.C. and D.C. potentials having such magnitudes that when individually applied across the electrodes of said elements, the ratio of the intensity of the A.C.-excited light divided by the intensity of the D.C.-excited light is from about 0.0001 to about 100; in the case said electroluminescent phosphor is in thin-film form, said preselected A.C. and D.C. potentials having such magnitudes that when individually applied across the electrodes of said elements, the ratio of the intensity of the A.C.-excited light divided by the intensity of the D.C.-excited light is from about 0.001 to about 20; and means for timing the application of said preselected A.C. and D.C. potentials across the electrodes of said elements so that application of said preselected D.C. potential occurs before application of said preselected A.C. potential is discontinued.

15. A potential-indicating device comprising: spaced electrodes; material between said electrodes comprising electroluminescent phosphor; individual application of A.C. potential to said electrodes causing said phosphor to emit continuing light; individual application of D.C. potential to said electrodes causing said phosphor to emit continuing light; A.C. and D.C. potentials adapted to be applied to said electrodes; one of said applied A.C. and D.C. potentials representing an unknown quantity of potential within known potential extremes; the other of said applied A.C. and D.C. potentials representing a preselected known quantity of potential; in the case said electroluminescent phosphor is in powdered form, said known potential having such value with respect to the known potential extremes of said unknown potential that when said preselected known quantity of potential and either of the known potential extremes of said unknown potential are individually applied to said electrodes, the ratio of the intensity of the A.C.-excited light divided by the intensity of the D.C.-excited light is from about 0.0001 to about 100; in the case said electroluminescent phosphor is in thin-film form, said known potential having such value with respect to the known potential extremes of said unknown potential that when said preselected known quantity of potential and either of the known potential extremes of said unknown potential are individually applied to said electrodes, the ratio of the intensity of the A.C.-excited light divided by the intensity of the D.C.-excited light is from about 0.001 to about 20; and means for timing the application of said A.C. and D.C. potentials across said spaced electrodes so that application of said D.C. potential occurs before application of said A.C. potential is discontinued.

16. An electrical device comprising: at least one light-generating unit comprising spaced electrodes and material between said electrodes comprising electroluminescent phosphor, individual application of A.C. potential to said electrodes exciting said phosphor to continuing light emission varying in intensity with the magnitude of the exciting A.C. potential, individual application of D.C. potential to said electrodes exciting said phosphor to continuing light emission varying in intensity with the magnitude of the exciting D.C. potential, selected A.C. and D.C. potentials adapted to be applied across said electrodes, at least one of said selected A.C. and D.C. potentials adapted to be varied in magnitude, said applied A.C. and D.C. potentials falling within such potential values that when simultaneously applied across said electrodes the resultant light emission is measurably greater than the sum of the resultant light emissions if said selected A.C. potential and then said selected D.C. potential are individually applied across said electrodes, and means for timing the application of said selected A.C. and D.C. potentials across said electrodes so that application of said selected D.C. potential occurs before application of said selected A.C. potential is discontinued; at least one light-receiving unit comprising photosensitive means in receptive proximity to said light-generating unit to receive light generated thereby and to convert such received light into an electrical signal.

17. An electrical device comprising: a light-generating unit comprising spaced electrodes and material between said electrodes comprising electroluminescent phosphor, individual application of A.C. potential to said electrodes exciting said phosphor to continuing light emission varying in intensity with the magnitude of the exciting A.C. potential, individual application of D.C. potential to said electrodes exciting said phosphor to continuing light emission varying in intensity with the magnitude of the exciting D.C. potential, selected A.C. and D.C. potentials adapted to be applied across said electrodes, at least one of said selected A.C. and D.C. potentials adapted to be varied in magnitude, in the case said phosphor is in powdered form said applied A.C. and D.C. potentials falling within such potential values that when individually applied across said electrodes the ratio of the intensity of the A.C.-excited light divided by the intensity of the D.C.-excited light is from about 0.0001 to about 100, in the case said phosphor is in thin-film form said applied A.C. and D.C. potentials falling within such potential values that when individually applied across said electrodes the ratio of the intensity of the A.C.-excited light divided by the intensity of the D.C.-excited light is from about 0.001 to about 20, and means for timing the application of said selected A.C. and D.C. potentials across said spaced electrodes so that application of said D.C. potential occurs before application of said selected A.C. potential is discontinued; a light-receiving unit comprising, photosensitive means in receptive proximity to said light-generating unit to receive light generated thereby, potential source means connecting to said photosensitive means to deliver a signal current thereto, said photosensitive means carrying a signal current varying in magnitude with the intensity of light received by said photosensitive means, and signal-converting means included with said photosensitive means and said connecting potential source means for converting current carried by said photosensitive means into an electrical signal.

18. An electrical device comprising: at least one light-generating unit comprising spaced electrodes and material between said electrodes comprising electroluminescent phosphor, individual application of A.C. potential to said electrodes exciting said phosphor to continuing light emission varying in intensity with the magnitude of the exciting A.C. potential, individual application of D.C. potential to said electrodes exciting said phosphor to continuing light emission varying in intensity the magnitude of the exciting D.C. potential, selected A.C. and D.C. potentials adapted to be applied across said electrodes, at least one of said selected A.C. and D.C. potentials adapted to be varied in magnitude, said applied A.C. and D.C. potentials falling within such values that when simultaneously applied across said electrodes the resultant light emission is measurably greater than the sum of the resultant light emissions if said selected A.C. potential and then said selected D.C. potential are individually applied across said electrodes, and means for timing the application of said selected A.C. and D.C. potentials across said electrodes so that application of said selected D.C. potential occurs before application of said selected A.C. potential is discontinued; at least one light-receiving unit comprising, photosensitive means in receptive proximity to said light-generating unit to receive light generated thereby, said photosensitive means delivering an electrical current in response to light received from said light-generating unit, and a current-detecting means included with said photosensitive means and responsive to the current carried by said photosensitive means under light excitation from said light-generating unit.

19. An imaging device comprising: a first grid comprising substantially parallel and spaced conductors; a second grid comprising substantially parallel and spaced conductors separated from said first grid with the axes of the conductors comprising said second grid axially aligned at an angle to the axes of the conductors comprising said first grid; material comprising finely-divided electroluminescent phosphor between said grids; individual application of A.C. potential across said grids exciting said phosphor material to continuing light emission varying in intensity with the magnitude of the exciting A.C. potential; individual application of D.C. potential across said grids exciting said phosphor material to continuing light emission varying in intensity with the magnitude of the exciting D.C. potential; selected A.C. and D.C. potentials adapted to be applied across said grids; at least one of said selected A.C. and D.C. potentials adapted to be varied in magnitude in accordance with the relative positions of the conductors comprising said grids in accordance with a preselected pattern; said applied A.C. and D.C. potentials having such values as applied across said grids that when individually applied thereacross, the ratio of intensity of the A.C.-excited light divided by the intensity of the D.C.-excited light is from 0.0001 to about 100; and means for timing the application of said selected A.C. and D.C. potentials across said grids so that application of said selected D.C. potential occurs before application of said A.C. potential is discontinued.

References Cited in the file of this patent
UNITED STATES PATENTS

| | | |
|---|---|---|
| 2,791,723 | Nagy et al. | May 7, 1957 |
| 2,792,447 | Kazan | May 14, 1957 |
| 2,841,730 | Piper | July 1, 1958 |
| 2,873,380 | Kazan | Feb. 10, 1959 |
| 2,877,371 | Orthuber et al. | Mar. 10, 1959 |

FOREIGN PATENTS

| | | |
|---|---|---|
| 1,004,301 | Germany | Mar. 14, 1957 |

OTHER REFERENCES

Proceedings of the I.R.E., October 1957, pages 1358 to 1364.